United States Patent
Braddy et al.

(10) Patent No.: US 8,613,048 B2
(45) Date of Patent: Dec. 17, 2013

(54) METHOD AND APPARATUS FOR PROVIDING AUTHORIZED REMOTE ACCESS TO APPLICATION SESSIONS

(75) Inventors: Ricky Gene Braddy, Fort Lauderdale, FL (US); Timothy Ernest Simmons, Fort Lauderdale, FL (US); David Sean Stone, Lauderdale By-The-Sea, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1230 days.

(21) Appl. No.: 10/711,731

(22) Filed: Sep. 30, 2004

(65) Prior Publication Data

US 2006/0070131 A1   Mar. 30, 2006

(51) Int. Cl.
    *H04L 29/06*   (2006.01)
(52) U.S. Cl.
    USPC ............. 726/4; 726/14; 726/15; 726/27
(58) Field of Classification Search
    None
    See application file for complete search history.

(56) References Cited

U.S. PATENT DOCUMENTS

| | | |
|---|---|---|
| 4,779,189 A | 10/1988 | Legvold et al. |
| 5,057,996 A | 10/1991 | Cutler et al. |
| 5,129,084 A | 7/1992 | Kelly, Jr. et al. |
| 5,175,852 A | 12/1992 | Johnson et al. |
| 5,187,790 A | 2/1993 | East et al. |
| 5,202,971 A | 4/1993 | Henson et al. |
| 5,249,290 A | 9/1993 | Heizer |
| 5,297,283 A | 3/1994 | Kelly, Jr. et al. |
| 5,321,841 A | 6/1994 | East et al. |
| 5,341,478 A | 8/1994 | Travis, Jr. et al. |
| 5,418,964 A | 5/1995 | Conner et al. |
| 5,437,025 A | 7/1995 | Bale et al. |
| 5,461,608 A | 10/1995 | Yoshiyama et al. |
| 5,473,599 A | 12/1995 | Li et al. |
| 5,499,343 A | 3/1996 | Pettus |
| 5,504,677 A | 4/1996 | Pollin ..................... 364/408 |
| 5,504,814 A | 4/1996 | Miyahara |
| 5,511,208 A | 4/1996 | Boyles et al. |
| 5,515,508 A | 5/1996 | Pettus et al. |

(Continued)

FOREIGN PATENT DOCUMENTS

| | | |
|---|---|---|
| EP | 0 442 839 A2 | 8/1991 |
| EP | 0 643 514 A2 | 3/1995 |

(Continued)

OTHER PUBLICATIONS

Sapuntzakis, Constantine, "Optimizing the Migration of Virtual Computers", USENIX Association, 5th Symposium on Operatin Systems Design and Implementation, pp. 1-14.*

(Continued)

*Primary Examiner* — Benjamin Lanier
(74) *Attorney, Agent, or Firm* — Foley & Lardner LLP; John D. Lanza

(57) ABSTRACT

A method and apparatus for providing authorized remote access to one or more application sessions includes a client node, a collection agent, a policy engine, and a session server. The client node requests access to a resource. The collection agent gathers information about the client node. The policy engine receives the gathered information, and makes an access control decision based on the received information. The session server establishes a connection between a client computer operated by the user and the one or more application sessions associated with the user of the client node identified in response to the received information.

41 Claims, 11 Drawing Sheets

(56) References Cited

U.S. PATENT DOCUMENTS

| | | |
|---|---|---|
| 5,553,242 A | 9/1996 | Russell et al. |
| 5,557,748 A | 9/1996 | Norris |
| 5,561,769 A | 10/1996 | Kumar et al. |
| 5,586,312 A | 12/1996 | Johnson et al. |
| 5,590,199 A | 12/1996 | Krajewski, Jr. et al. |
| 5,596,745 A | 1/1997 | Lai et al. |
| 5,606,668 A | 2/1997 | Shwed et al. |
| 5,633,929 A | 5/1997 | Kaliski, Jr. |
| 5,657,390 A | 8/1997 | Elgamal et al. |
| 5,701,484 A | 12/1997 | Artsy |
| 5,706,437 A | 1/1998 | Kirchner et al. |
| 5,729,734 A | 3/1998 | Parker et al. |
| 5,734,865 A | 3/1998 | Yu |
| 5,737,622 A | 4/1998 | Rogers et al. |
| 5,757,795 A | 5/1998 | Schnell |
| 5,761,662 A | 6/1998 | Dasan |
| 5,764,915 A | 6/1998 | Heimsoth et al. |
| 5,794,207 A | 8/1998 | Walker et al. |
| 5,802,306 A | 9/1998 | Hunt |
| 5,828,840 A | 10/1998 | Cowan et al. |
| 5,835,726 A | 11/1998 | Shwed et al. |
| 5,838,910 A | 11/1998 | Domenikos et al. |
| 5,838,916 A | 11/1998 | Domenikos et al. |
| 5,844,553 A | 12/1998 | Hao et al. |
| 5,848,410 A | 12/1998 | Walls et al. |
| 5,860,068 A | 1/1999 | Cook |
| 5,867,494 A | 2/1999 | Krishnaswamy et al. |
| 5,884,046 A | 3/1999 | Antonov |
| 5,928,363 A | 7/1999 | Ruvolo |
| 5,938,733 A | 8/1999 | Heimsoth et al. |
| 5,951,694 A | 9/1999 | Choquier et al. |
| 5,960,170 A | 9/1999 | Chen et al. |
| 5,968,176 A | 10/1999 | Nessett et al. |
| 5,983,190 A | 11/1999 | Trower, II et al. |
| 5,983,268 A | 11/1999 | Freivald et al. |
| 5,987,611 A | 11/1999 | Freund |
| 5,999,179 A | 12/1999 | Kekic et al. |
| 5,999,525 A | 12/1999 | Krishnaswamy et al. |
| 6,003,030 A | 12/1999 | Kenner et al. |
| 6,026,440 A | 2/2000 | Shrader et al. |
| 6,032,260 A | 2/2000 | Sasmazel et al. |
| 6,058,431 A | 5/2000 | Srisuresh et al. |
| 6,085,247 A | 7/2000 | Parsons, Jr. et al. |
| 6,088,728 A | 7/2000 | Bellemore et al. |
| 6,092,114 A * | 7/2000 | Shaffer et al. ............... 709/232 |
| 6,108,712 A | 8/2000 | Hayes, Jr. |
| 6,151,599 A * | 11/2000 | Shrader et al. ............... 707/9 |
| 6,157,953 A | 12/2000 | Chang et al. |
| 6,161,126 A | 12/2000 | Wies et al. |
| 6,199,753 B1 | 3/2001 | Tracy et al. |
| 6,219,669 B1 | 4/2001 | Haff et al. |
| 6,223,288 B1 | 4/2001 | Byrne |
| 6,272,556 B1 | 8/2001 | Gish |
| 6,321,337 B1 | 11/2001 | Reshef et al. |
| 6,335,927 B1 | 1/2002 | Elliott et al. |
| 6,345,239 B1 | 2/2002 | Bowman-Amuah |
| 6,377,952 B1 | 4/2002 | Inohara et al. |
| 6,383,478 B1 | 5/2002 | Prokop et al. |
| 6,405,219 B2 | 6/2002 | Saether et al. |
| 6,405,252 B1 | 6/2002 | Gupta et al. |
| 6,412,007 B1 | 6/2002 | Bui et al. |
| 6,415,329 B1 | 7/2002 | Gelman et al. |
| 6,421,726 B1 | 7/2002 | Kenner et al. |
| 6,427,132 B1 | 7/2002 | Bowman-Amuah |
| 6,442,571 B1 | 8/2002 | Haff et al. |
| 6,452,915 B1 | 9/2002 | Jorgensen |
| 6,463,470 B1 | 10/2002 | Mohaban et al. |
| 6,463,474 B1 | 10/2002 | Fuh et al. |
| 6,466,984 B1 | 10/2002 | Naveh et al. |
| 6,470,453 B1 | 10/2002 | Vilhuber |
| 6,496,935 B1 | 12/2002 | Fink et al. |
| 6,502,125 B1 | 12/2002 | Kenner et al. |
| 6,502,131 B1 | 12/2002 | Vaid et al. |
| 6,519,581 B1 | 2/2003 | Hofmann et al. |
| 6,584,569 B2 | 6/2003 | Reshef et al. |
| 6,587,878 B1 | 7/2003 | Merriam |
| 6,591,367 B1 | 7/2003 | Kobata et al. |
| 6,606,744 B1 | 8/2003 | Mikurak |
| 6,609,154 B1 | 8/2003 | Fuh et al. |
| 6,609,198 B1 | 8/2003 | Wood et al. |
| 6,611,522 B1 | 8/2003 | Zheng et al. |
| 6,611,867 B1 | 8/2003 | Bowman-Amuah |
| 6,625,643 B1 | 9/2003 | Colby et al. |
| 6,625,645 B1 | 9/2003 | Van Horne et al. |
| 6,640,240 B1 | 10/2003 | Hoffman et al. |
| 6,640,248 B1 | 10/2003 | Jorgensen |
| 6,643,774 B1 | 11/2003 | McGarvey |
| 6,658,021 B1 | 12/2003 | Bromley et al. |
| 6,665,706 B2 | 12/2003 | Kenner et al. |
| 6,671,818 B1 | 12/2003 | Mikurak |
| 6,691,232 B1 | 2/2004 | Wood et al. |
| 6,697,849 B1 | 2/2004 | Carlson |
| 6,701,432 B1 | 3/2004 | Deng et al. |
| 6,718,380 B1 | 4/2004 | Mohaban et al. |
| 6,731,625 B1 | 5/2004 | Eastep et al. |
| 6,741,853 B1 | 5/2004 | Jiang et al. |
| 6,754,181 B1 | 6/2004 | Elliott et al. |
| 6,766,454 B1 | 7/2004 | Riggins |
| 6,772,203 B1 | 8/2004 | Feiertag et al. |
| 6,772,347 B1 | 8/2004 | Xie et al. |
| 6,799,221 B1 | 9/2004 | Kenner et al. |
| 6,850,943 B2 | 2/2005 | Teixeira et al. |
| 6,856,651 B2 | 2/2005 | Singh |
| 6,868,451 B1 | 3/2005 | Peacock |
| 6,871,346 B1 | 3/2005 | Kumbalimutt et al. |
| 6,873,988 B2 | 3/2005 | Herrmann et al. |
| 6,880,005 B1 | 4/2005 | Bell et al. |
| 6,892,201 B2 | 5/2005 | Brown et al. |
| 6,901,072 B1 | 5/2005 | Wong |
| 6,901,075 B1 | 5/2005 | Baron |
| 6,909,708 B1 | 6/2005 | Krishnaswamy et al. |
| 6,914,886 B2 | 7/2005 | Peles et al. |
| 6,920,502 B2 | 7/2005 | Araujo et al. |
| 6,963,981 B1 | 11/2005 | Bailey et al. |
| 6,993,016 B1 | 1/2006 | Liva et al. |
| 7,036,051 B1 | 4/2006 | Fernandes |
| 7,069,434 B1 | 6/2006 | Ilnicki et al. |
| 7,092,370 B2 | 8/2006 | Jiang et al. |
| 7,100,054 B2 | 8/2006 | Wenisch et al. |
| 7,100,195 B1 * | 8/2006 | Underwood ............... 726/2 |
| 7,102,996 B1 | 9/2006 | Amdahl et al. |
| 7,113,962 B1 | 9/2006 | Kee et al. |
| 7,114,180 B1 | 9/2006 | DeCaprio |
| 7,117,359 B2 | 10/2006 | Wood et al. |
| 7,117,504 B2 | 10/2006 | Smith et al. |
| 7,120,666 B2 | 10/2006 | McCanne et al. |
| 7,124,101 B1 | 10/2006 | Mikurak |
| 7,130,807 B1 | 10/2006 | Mikurak |
| 7,136,645 B2 | 11/2006 | Hanson et al. |
| 7,145,898 B1 | 12/2006 | Elliott |
| 7,164,885 B2 | 1/2007 | Jonsson et al. |
| 7,165,222 B1 | 1/2007 | Suzuki |
| 7,178,166 B1 * | 2/2007 | Taylor et al. ............... 726/25 |
| 7,246,230 B2 | 7/2007 | Stanko |
| 7,260,840 B2 | 8/2007 | Swander et al. |
| 7,269,664 B2 | 9/2007 | Hutsch et al. |
| 7,277,953 B2 | 10/2007 | Wils et al. |
| 7,293,099 B1 | 11/2007 | Kalajan |
| 7,353,533 B2 | 4/2008 | Wright et al. |
| 7,363,347 B2 | 4/2008 | Thomas |
| 7,522,732 B2 | 4/2009 | Whitehead |
| 7,631,089 B2 | 12/2009 | Knauerhase et al. |
| 7,676,675 B2 | 3/2010 | Billharz et al. |
| 2001/0023421 A1 | 9/2001 | Numao et al. |
| 2001/0037387 A1 | 11/2001 | Gilde et al. |
| 2001/0047406 A1 | 11/2001 | Araujo et al. |
| 2002/0032725 A1 | 3/2002 | Araujo et al. |
| 2002/0035451 A1 | 3/2002 | Rothermel |
| 2002/0049608 A1 | 4/2002 | Hartsell et al. |
| 2002/0111972 A1 | 8/2002 | Lynch et al. |
| 2002/0133723 A1 | 9/2002 | Tait |
| 2002/0138618 A1 | 9/2002 | Szabo |
| 2002/0147927 A1 | 10/2002 | Tait |
| 2002/0152373 A1 | 10/2002 | Sun et al. |

(56) References Cited

U.S. PATENT DOCUMENTS

| | | |
|---|---|---|
| 2002/0165971 A1 | 11/2002 | Baron |
| 2002/0169887 A1 | 11/2002 | MeLampy et al. |
| 2002/0184224 A1 | 12/2002 | Haff et al. |
| 2003/0004950 A1* | 1/2003 | Wils et al. ............... 707/10 |
| 2003/0046578 A1 | 3/2003 | Brown et al. |
| 2003/0046586 A1 | 3/2003 | Bheemarasetti et al. |
| 2003/0046587 A1 | 3/2003 | Bheemarasetti et al. |
| 2003/0055962 A1 | 3/2003 | Freund et al. |
| 2003/0067874 A1 | 4/2003 | See et al. |
| 2003/0069923 A1 | 4/2003 | Peart |
| 2003/0084165 A1 | 5/2003 | Kjellberg et al. |
| 2003/0110192 A1 | 6/2003 | Valente et al. |
| 2003/0120601 A1 | 6/2003 | Ouye et al. |
| 2003/0131079 A1 | 7/2003 | Neale et al. |
| 2003/0131100 A1 | 7/2003 | Godon et al. |
| 2003/0135626 A1 | 7/2003 | Ray et al. |
| 2003/0154239 A1 | 8/2003 | Davis et al. |
| 2003/0163693 A1 | 8/2003 | Medvinsky |
| 2003/0172138 A1 | 9/2003 | McCormack et al. |
| 2003/0177248 A1 | 9/2003 | Brown et al. |
| 2003/0177389 A1 | 9/2003 | Albert et al. |
| 2003/0182423 A1 | 9/2003 | Shafir et al. |
| 2003/0182431 A1 | 9/2003 | Sturniolo et al. |
| 2003/0188001 A1 | 10/2003 | Eisenberg et al. |
| 2003/0188193 A1 | 10/2003 | Venkataramappa |
| 2003/0191799 A1 | 10/2003 | Araujo et al. |
| 2003/0195759 A1 | 10/2003 | Glassco et al. |
| 2003/0198189 A1 | 10/2003 | Roberts et al. |
| 2003/0200234 A1 | 10/2003 | Koppich et al. |
| 2003/0202480 A1 | 10/2003 | Swami |
| 2003/0212776 A1 | 11/2003 | Roberts et al. |
| 2003/0212817 A1 | 11/2003 | Matthews et al. |
| 2003/0223361 A1 | 12/2003 | Hussain et al. |
| 2003/0229718 A1 | 12/2003 | Tock et al. |
| 2003/0233541 A1 | 12/2003 | Fowler et al. |
| 2003/0233581 A1 | 12/2003 | Reshef et al. |
| 2004/0003959 A1 | 1/2004 | Koizumi et al. |
| 2004/0010601 A1 | 1/2004 | Afergan et al. |
| 2004/0010621 A1 | 1/2004 | Afergan et al. |
| 2004/0039594 A1 | 2/2004 | Narasimhan et al. |
| 2004/0039827 A1 | 2/2004 | Thomas et al. |
| 2004/0049515 A1 | 3/2004 | Haff et al. |
| 2004/0073512 A1* | 4/2004 | Maung ............... 705/51 |
| 2004/0078621 A1 | 4/2004 | Talaugon et al. |
| 2004/0078772 A1 | 4/2004 | Balay et al. |
| 2004/0095934 A1 | 5/2004 | Cheng et al. |
| 2004/0107360 A1 | 6/2004 | Herrmann et al. |
| 2004/0111642 A1 | 6/2004 | Peles |
| 2004/0125756 A1 | 7/2004 | Lepore et al. |
| 2004/0139178 A1 | 7/2004 | Mendez et al. |
| 2004/0148292 A1 | 7/2004 | Clemens |
| 2004/0148514 A1 | 7/2004 | Fee et al. |
| 2004/0158429 A1 | 8/2004 | Bary et al. |
| 2004/0162876 A1 | 8/2004 | Kohavi |
| 2004/0177247 A1 | 9/2004 | Peles |
| 2004/0210320 A1 | 10/2004 | Pandya |
| 2004/0210771 A1 | 10/2004 | Wood et al. |
| 2004/0215826 A1 | 10/2004 | Pfitzner |
| 2004/0250124 A1 | 12/2004 | Chesla et al. |
| 2004/0250130 A1* | 12/2004 | Billharz et al. ............... 713/201 |
| 2004/0255154 A1 | 12/2004 | Kwan et al. |
| 2004/0258003 A1 | 12/2004 | Kokot et al. |
| 2005/0015601 A1 | 1/2005 | Tabi |
| 2005/0025125 A1 | 2/2005 | Kwan |
| 2005/0050362 A1 | 3/2005 | Peles |
| 2005/0055570 A1 | 3/2005 | Kwan et al. |
| 2005/0063519 A1 | 3/2005 | James |
| 2005/0066163 A1 | 3/2005 | Ikenoya |
| 2005/0071652 A1 | 3/2005 | de Jong |
| 2005/0074126 A1 | 4/2005 | Stanko |
| 2005/0086206 A1 | 4/2005 | Balasubramanian et al. |
| 2005/0097441 A1 | 5/2005 | Herbach et al. |
| 2005/0120054 A1 | 6/2005 | Shulman et al. |
| 2005/0125684 A1 | 6/2005 | Schmidt |
| 2005/0132030 A1 | 6/2005 | Hopen et al. |
| 2005/0144481 A1 | 6/2005 | Hopen et al. |
| 2005/0172335 A1 | 8/2005 | Aday et al. |
| 2005/0188215 A1 | 8/2005 | Shulman et al. |
| 2005/0234852 A1 | 10/2005 | Coramutla |
| 2005/0246282 A1 | 11/2005 | Naslund et al. |
| 2005/0251573 A1 | 11/2005 | Merkow et al. |
| 2005/0254652 A1 | 11/2005 | Engler et al. |
| 2005/0262063 A1 | 11/2005 | Conboy et al. |
| 2005/0289110 A1 | 12/2005 | Giampaolo et al. |
| 2006/0004662 A1 | 1/2006 | Nadalin et al. |
| 2006/0015570 A1 | 1/2006 | Khemani et al. |
| 2006/0029016 A1 | 2/2006 | Peles |
| 2006/0041635 A1 | 2/2006 | Alexander et al. |
| 2006/0050703 A1 | 3/2006 | Foss |
| 2006/0069912 A1 | 3/2006 | Zheng et al. |
| 2006/0070131 A1 | 3/2006 | Braddy et al. |
| 2006/0072755 A1 | 4/2006 | Oskari |
| 2006/0075463 A1 | 4/2006 | Braddy et al. |
| 2006/0190455 A1 | 8/2006 | Braddy et al. |
| 2006/0200859 A1 | 9/2006 | England et al. |
| 2006/0206931 A1 | 9/2006 | Dillaway et al. |
| 2006/0230282 A1 | 10/2006 | Hausler |
| 2007/0061871 A1 | 3/2007 | Simpkins et al. |
| 2007/0101418 A1 | 5/2007 | Wood et al. |
| 2008/0086564 A1 | 4/2008 | Putman et al. |

FOREIGN PATENT DOCUMENTS

| | | |
|---|---|---|
| EP | 0863453 | 9/1998 |
| EP | 0927921 | 7/1999 |
| JP | 06-332782 | 12/1994 |
| JP | 6332782 | 12/1994 |
| JP | 10-191063 | 7/1998 |
| JP | 2002-513961 | 5/2002 |
| JP | 2002-259346 | 9/2002 |
| JP | 2002-328831 | 11/2002 |
| JP | 2002-366525 | 12/2002 |
| JP | 2004-021341 | 1/2004 |
| WO | WO 99-60462 | 11/1999 |
| WO | WO 00-51290 | 8/2000 |
| WO | WO-0062507 | 10/2000 |
| WO | WO 01-37517 | 5/2001 |
| WO | WO-0223362 | 3/2002 |
| WO | WO 02-39221 | 5/2002 |
| WO | WO-0237267 | 5/2002 |
| WO | WO-2004049672 | 6/2004 |
| WO | WO 2005-029313 | 3/2005 |

OTHER PUBLICATIONS

International Searching Authority, International Search Report related to PCT/US05/028606, mailed Feb. 24, 2006 (5 pages).

International Searching Authority, International preliminary report on patentability to PCT/US05/028606, issued Apr. 3, 2007 (10 pages).

Sirbu, et al., "Distributed authentication in Kerberos using public key cryptograph," Proc. 1997 Symposium on Network and Distributed Systems Security (SNDSS'97), 134-141, IEEE CS Press, 1997.

Perkins et al., Route Optimization in Mobile IP, Internet draft, work in progress, Sep. 2001.

Simon et al., "A Cryptographic Protocol to Obtain Secure Communications in Extended Ethernet Environment," Proc. 17th Conf. on Local Computer Networks, 254-261, IEEE CS Press, 1992.

Neuman et al., The Kerberos Network Authentication Service (V5), Internet draft, work in progress, Sep. 2004.

Allison, Bridget et al., "File System Security: Secure Network Data Sharing for NT and UNIX," in Network Appliance, Inc. Tech Library pp. 16 pgs. Jan. 1, 1998.

European Patent Office Examination Report dated Aug. 17, 2007 for Application No. 05798714. 3 pages.

Anonymous, "Health Canada Takes Its Network Pulse," *Communications News*, 48, Oct. 2001, available at http://www.findarticles.com/p/articles/mi_m0DUD/is_5_23/ai_86039142.

Anonymous, "Multiple Platforms Bring Multiple Challenges," *Communications News*, 56, Oct. 2001, available at http://www.findarticles.com/p/articles/mi_m0CMN/is_10_38/ai_79370488.

(56) References Cited

OTHER PUBLICATIONS

Anonymous, "Remote Access," *Secure Computing*, 47-60, Oct. 1997.

Antonoff, M., "Writing in a Spreadsheet," *Personal Computing*, 51-54, 1987.

Ao et al., "A Hierarchical Policy Specification Language, and Enforcement Mechanism, for Governing Digital Enterprises", *3rd IEEE International Workshop on Policies for Distributed Systems and Networks (Policy 2002)*, 38-49, IEEE CS Press, 2002, available at http://www.cs.rutgers.edu/~tdnguyen/pubs/ao-policy-2002.pdf.

Back et al., "Contracts, Games and Refinement," TUCS Technical Report No. 138, *Turku Centre for Computer Science*, Nov. 1-15, 1997.

Beers, C., "McAfee Shores Up Your Defenses," *Network Computing*, 38, Jun. 2003, available at http://www.networkcomputing.com/1412/1412sp3.html.

Bird, T., "Reduce the Threat from Computers," *Communications News*, 36, 38-39, Mar. 2005, available at http://www.comnews.com/stories/articles/0305/0305reduce_threat.htm.

Brekne, T., "Mobile Agents and (In-)Security," *Telektronikk*, 34-46, 2000.

Carvalho et al., "Supporting Flexible Data Feeds in Dynamic Sensor Grids Through Mobile Agents," Lecture Notes in Computer Science vol. 2535, *Proc. 6th International Conference on Mobile Agents (MA 2002)*, 171-185, Springer-Verlag, Germany, 2002.

Cheng et al., "Adjusting the Autonomy of Collections of Agents in Multiagent Systems," Lecture Notes in Computer Science vol. 3501, 33-37, *Advances in Artificial Intelligence: Proc. 18th Conference of the Canadian Society for Computational Studies of Intelligence (Canadian AI 2005)*, Springer-Verlag, Germany, 2005.

Corradi et al., "Policy-Driven Management of Agent Systems," Lecture Notes in Computer Science vol. 1995, *Policies for Distributed Systems and Networks: Proc. International Workshop (Policy 2001)*, 214-229, Springer-Verlag, Germany, 2001.

Dulay et al., "A Policy Deployment Model for the Ponder Language," *Proc. IEEE/IFIP International Symposium on Integrated Network Management (IM 2001)*, 529-543, Seattle, Washington, USA, IEEE Press, 2001.

Esposito, A. et al., "Integrating Concurrency Control and Distributed Data into Workflow Frameworks: An Actor Model Perspective," *2000 IEEE International Conference on Systems, Man, and Cybernetics*, vol. 3, 2110-2114, IEEE Press, 2000.

Feldman, M., "Enterprise Wrappers for Information Assurance," *Proc. DARPA Information Survivability Conference and Exposition (DISCEX '03)*, IEEE Press, 2003.

Fratto, M., "Hammering Out a Secure Framework," *Network Computing*, 79-80, 82, 84-87, 2000, available at http://www.networkcomputing.com/1101/1101f3.html.

Funk Software, "Funk Software's Endpoint Assurance Solution. The Secure Product Foundation for Endpoint Integrity," 2005, available at: http://www.juniper.net/welcome_funk.html.

Graniero, P.A. et al., "Investigating the Role of Fuzzy Sets in a Spatial Modeling Framework," *Proc. 9th IFSA World Congress and 20th NAFIPS International Conference*, 2370-2375, IEEE Press 2001.

Guy III, E.T., "An Introduction to the CAD Framework Initiative," Electro 1992 Conference Record, 78-83, Massachusetts, May 1992.

International Searching Authority, "International Search Report," PCT Application No. PCT/US05/028605, mailed on Jan. 18, 2005, 7 pgs.

International Searching Authority, "Written Opinion," PCT Application No. PCT/US05/028605, mailed on Jan. 18, 2006, 7 pgs.

International Searching Authority, "Partial International Annexed to Invitation to Pay fees," PCT Application No. PCT/US05/028607, mailed on Dec. 14, 2005, 7 pgs.

Jin, H. et al., "A Distributed Dynamic µFirewall Architecture With Mobile Agents and KeyNote Trust Management System," Lecture Notes in Computer Science, vol. 2513, *Proc. 4th International Conference on Information and Communications Security*, (ICICS 2002), 13-24, Springer-Verlag, Germany, 2002.

Jun, M. et al., "Application of Mobile Scanning Agent in the Network Security," *J. of Systems Engineering and Electronic*, 15(3): 371-376, 2004.

Juniper Networks, "Juniper Networks Infranet Controllers Provide Unified Access Control for all Users throughout Your Network," (Oct. 2005), available at: http://www.juniper.net/products/ua/dsheet/100137.pdf.

Keromytis, A.D. et al., "Transparent Network Security Policy Enforcement," *Proc. USENIX Technical Conference*, 215-225, San Diego, CA, USA, 2000.

Kim, S.C. et al., "Study of Security Management System Based on Client/Server Model," 1403-1408, IEEE Press, 1999.

Klein, D., "Developing Applications with a UIMS," *Proc. USENIX Applications Development Symposium*, 37-56, 1994.

Kosar, T. et al., "A Framework for Reliable and Efficient Data Placement in Distributed Computing Systems," *Journal of Parallel and Distributed Computing*, vol. 65 (10), 1146-1157, Academic Press, Inc., Orlando, FL, USA, 2005.

Krief, F. et al., "An Intelligent Policy-Based Networking Environment for Dynamic Negotiation, Provisioning and Control of QoS," *IFIP TC6/WG6.2 & WG6.7 Conference on Network Control and Engineering for QoS, Security and Mobility*, (Net-Con 2002), 285-290, Kluwer Academic Publishers, 2002.

Law, K.L.E. et al., "Performance of a Multi-Tiered Policy-Based Management System," *IFIP TC6/WG6.2 & WG6.7 Conference on Network Control and Engineering for QoS, Security and Mobility*, (Net-Con 2002), 203-214, Kluwer Academic Publishers, 2002.

Law, K.L.E. et al., "Policy-Based Management With Active Networks," *IFIP TC6/WG6.2 & WG6.7 Conference on Network Control and Engineering for QoS, Security and Mobility*, (Net-Con 2002), 129-140, Kluwer Academic Publishers, 2002.

Law, K.L.E. et al., "UPM: Unified Policy-Based Network Management," *Proc. SPIE*, (ITCom 2001), vol. 4523, 326-337, Denver, CO, USA, 2001.

Lee, D.W. et al., "Managing Fault Tolerance Information in Multi-Agents Based Distributed Systems," Lecture Notes in Computer Science, vol. 2690, *Intelligent Data Engineering and Automated Learning*, (IDEAL 2003), 104-108, Springer-Verlag, Germany, 2003.

Maes, S. et al., "Identifiability of Causal Effects in a Multi-Agent Causal Model," *IEEE/WIC International Conference on Intelligent Agent Technology*, (IAT'03), 605, IEEE Press, 2003.

Mahler, R.P. et al. "Technologies for Unified Collection and Control of UCAVs," *Proc. of SPIE* vol. 4729, 90-101, 2002.

Matsuura, S. et al., "An Extension of ECA Architecture and its Application to HTML Document Browsing," *IEEE International Conference on Systems, Man, and Cybernetics*, vol. 1, 738-743, IEEE Press 1999.

Maxim, M. and Venugopal, A., "Securing Agent Based Architectures," Lecture Notes in Computer Science vol. 2480, *Proc. First International Conference on Engineering and Deployment of Cooperative Information Systems*, 220-231, Springer-Verlag, Germany, 2002.

McAfee System Protection Solutions, "Enforcing Endpoint Policies for Network Access Selecting the Right Solution for your Environment," 2005, available at: http://mcafee.com/us/local_content/white_papers/wp_mpe_securingyournetwork.pdf.

McAfee System Protection Solutions, "McAfee Policy Enforcer," 2005, available at: http://www.mcafee.com/us/local_content/datasheets/ds_policy_enforcer.pdf.

Meyer, B. et al., "Towards Implementing Policy-Based Systems Management," *Distrib. Syst. Engng* vol. 3, 78-85, The Institution of Electrical Engineers and IOP Publishing, Ltd., 1996, available at http://www.mobile.ifi.lmu.de/common/Literatur/MNMPub/Publikationen/map96/PDF-Version/map96.pdf.

Molta, D., "Odyssey Makes Wireless LANs a Safe Trip," *Networking Computing*, 24, 26, 2002, available at http://www.networkcomputing.com/1311/1311sp2.html.

Montanari, R. et al., "Context-Based Security Management for Multi-Agent Systems," *Proc. Second IEEE Symposium on Multi-Agent Security and Survivability* (MAS&S 2005), IEEE Press, 2005.

Page, S.E., "Self Organization and Coordination," *Computational Economics*, vol. 18, 25-48, Kluwer Academic Publishers, 2001.

(56) References Cited

OTHER PUBLICATIONS

Palmer, D. et al., "Decentralized Cooperative Auction for Multiple Agent Task Allocation Using Synchronized Random Number Generators," *Proc. IEEE/RSJ International Conference on Intelligent Robots and Systems*, 1963-1968, IEEE Press, 2003.
Patwardhan, A. et al., "Enforcing Policies in Pervasive Environments," *First Annual International Conference on Mobile and Ubiquitous Systems: Networking and Services*, (MobiQuitous '04), 299-308, IEEE Press, 2004.
Randic, M. et al., "Object by Value Transfer Mechanisms for Obligation Policy Enforcement Object Loading," *Proc. 12th IEEE Mediterranean Electrotechnical Conference*, (Melecon 2004), IEEE Press, 2004.
Suri, N. et al., "DAML-Based Policy Enforcement for Semantic Data Transformation and Filtering in Multi-Agent Systems," *Lecture Notes in Computer Science*, vol. 2691, *Proc. 2nd International Joint Conference on Autonomous Agents and Multi-Agent Systems*, (AAMAS 2003), 1132-1133, ACM Press, New York, USA, 2003.
Suri, N. et al., "Enforcement of Communications Policies in Software Agent Systems through Mobile Code," *Proc. 4th International Workshop on Policies for Distributed Systems and Network*, (Policy'03), 247, IEEE Press, 2003.
Takahaski, K. et al., "Integrating Heterogeneous and Distributed Information by Linking it to Structured Information as an 'Information Integration Directory'," J81-D-I(5): 443-450, 1998.
TCG Published, "TCG Trusted Network Connect TNC Architecture for Interoperability," 2005, available at: https://www.trustedcomputinggroup.org/groups/network/TNC_Architecture_v1_0_r4.pdf.
TCG Published, "TCG Trusted Network Connect TNC IF-IMC," 2005, available at: https://www.trustedcomputinggroup.org/groups/network/TNC_IFIMC_v1_0_r3.pdf.
TCG Published, "TCG Trusted Network Connect TNC IF-IMV," 2005, available at: https://www.trustedcomputinggroup.org/groups/network/TNC_IFIMV_v1_0_r3.pdf.
Trusted Computing Group, "Trusted Network Connect to Ensure Endpoint Integrity," 2005, available at: https://www.trustedcomputinggroup.org/groups/network/TNC_NI-collateral_10_may_(2).pdf.
Trusted Computing Group, "Trusted Network Connect Open Standards for Integrity-Based Network Access Control," 2005, available at: https://www.trustedcomputinggroup.org/groups/network/Open_Standards_for_IntegrityBased_AccessControl.pdf.
Uszok, A. et al., "KAoS Policy and Domain Services: Toward a Description-Logic Approach to Policy Representation, Deconfliction, and Enforcement," *Proc. 4th International Workshop on Policies for Distributed Systems and Networks*, (Policy'03), 93, IEEE Press, 2003.
Wang, D. et al., "Study oOn SOAP-Based Mobile Agent Techniques," *Lecture Notes in Computer Science*, vol. 2480, *Proc. First International Conference on Engineering and Deployment of Cooperative Information Systems*, 208-219, Springer-Verlag, Germany, 2002.
Wittner, O. and Helvik, B.E., "Distributed Soft Policy Enforcement by Swarm Intelligence; Application to Loadsharing and Protection," *Ann. Telecommun.*, vol. 59, No. 1-2, 10-24, 2004.
Xia, H. et al., "Using Secure Coprocessors to Protect Access to Enterprise Networks," *Lecture Notes in Computer Science*, vol. 3462, *Proc. International IFIP-TC6 Networking Conference*, (Networking 2005), Springer-Verlag, Germany, 2005, available at http://www.cs.pitt.edu/~jcb/papers/net2005.pdf.
Xu, Y. et al., "An Agent-Based Data Collection Architecture for Distributed Simulations," *Int '1.J. of Modelling and Simulation*, 24(2), 55-64, 2004.
Yang, K. et al., "Service and Network Management Middleware for Cooperative Information Systems through Policies and Mobile Agents," *Lecture Notes in Computer Science*, vol. 2480, *Proc. First International Conference on Engineering and Deployment of Cooperative Information Systems*, 232-246, Springer-Verlag, Germany, 2002.

Yang, S., "Setting up a Secure Public Workstation," 153-162.
Yocom, B., et al., "A First Look at Wireless Security Products," *Business Comm. Review*, 36-48, Oct. 2003.
Yu, Y. et al., "Quality of Service Policy Control in Virtual Private Networks," *Proc. of SPIE*, vol. 5282, 1055-1060, 2003.
Zhang, Y. And You, J., "An RBAC Based Policy Enforcement Coordination Model in Internet Environment," *Lecture Notes in Computer Science*, vol. 2480, *Proc. First International Conference on Engineering and Deployment of Cooperative Information Systems*, 466-477, Springer-Verlag, Germany, 2002.
International Searching Authority, "International Search Report," PCT Application No. PCT/ US05/028607, mailed on Mar. 31, 2006, 10 pgs.
International Searching Authority, "Written Opinion," PCT Application No. PCT/ US05/028607, mailed on Mar. 31, 2006, 10 pgs.
Juniper Networks NetScreen-SA 5000 Series. Spec Sheet Access Appliances. Juniper Networks, Sunnyvale, CA., 4 pages.
Non Final Office Action dated Jun. 6, 2008. USPTO U.S. Appl. No. 10/711,729.
Non Final Office Action dated Jun. 27, 2008. USPTO U.S. Appl. No. 10/711,730.
Administrator's Guide, Citrix NFuse Classic. Version 1.7, Citrix Systems Inc.
Citrix MetaFrame XP Security Standards and Deployment Scenarios. MetaFrame XP Server for Windows with Feature Release 3. Citrix Systems Inc.
Kohl and Neuman, The Kerberos Network Authentication Service (V5), Internet draft, available online http://www.ietf.org/rfc/rfc1510.txt. Sep. 1993.
Anonymous: "Citrix Metaframe 1.8—Backgrounder", Internet Publication, Apr. 24, 1999, XP002217973.
European Search Report for European Application No. 08 00 9196, date of completion Oct. 23, 2008. (7 pages).
Tierling, E.: "Gezaehmtes Monster", CT Magazin Fuer Computer TEchnik, Verlag Heinz Heise GMBH., Hannover, DE, No. 10, 1998, pp. 226-228, 230, 23, XP000740851, ISSN: 0724-8679.
Restriction requirement for U.S. Appl. No. 10/956,764 dated Apr. 1, 2009.
Office Action for U.S. Appl. No. 10/956,764 dated Oct. 8, 2008.
Office Action for U.S. Appl. No. 10/711,730 dated Apr. 28, 2009.
Office Action for U.S. Appl. No. 10/711,730 dated Dec. 11, 2008.
Office Action for U.S. Appl. No. 10/711,730 dated Jun. 27, 2009.
Office action for U.S. Appl. No. 11/272,598 dated Oct. 7, 2008.
EP examination report for EP appln 05798714.1 dated May 19, 2009.
Office Action for U.S. Appl. No. 10/956,764 dated Jul. 7, 2009.
Office Action for U.S. Appl. No. 10/956,835 dated Sep. 1, 2009.
Office Action for U.S. Appl. No. 11/255,311 dated Jun. 23, 2009.
Office Action for U.S. Appl. No. 11/272,598 dated Jul. 23, 2009.
EP examination report for appl 07115385.9 dated May 23, 2008.
Office Action for AU appln 2005292566 dated May 6, 2009.
Office Action for U.S. Appl. No. 10/711,729 dated Sep. 4, 2009.
Office Action for CN appln 200580047061 dated Jul. 17, 2009.
Citrix Metaframe XPa for windows 2002.
Yang, S., "Setting up a Secure Public Workstation," "IOLS '99: Proceedings of the 14th Integrated Online Library Systems Meeting May 19-20, 1999,", May 1998.
Office Action for U.S. Appl. No. 10/956,764 dated Mar. 4, 2010.
Notice of Allowance for U.S. Appl. No. 10/711,730.
Notice of Allowance for U.S. Appl. No. 10/711,729.
Advisory action for U.S. Appl. No. 10/711,731 dated Jan. 21, 2009.
EPO Examination Report dated Aug. 17, 2007 for Appln No. 05798714, 3 pages.
Examiner Comments for preparation of Oral Proceedings on Nov. 1, 2011 in EPO in Berlin for EP 05798714 dated Dec. 30, 2010.
Non Final Office Action dated Jun. 17, 2008. USPTO U.S. Appl. No. 10/711,731.
Notice of Allowance for U.S. Appl. No. 10/956,764 dated Sep. 21, 2010.
Notice of Allowance for U.S. Appl. No. 10/956,832 dated Sep. 21, 2010.
Notice of Reasons for Rejection for JP 2007-534587 dated Dec. 10, 2010.
Office action for U.S. Appl. No. 10/711,731 dated Apr. 17, 2009.

(56) References Cited

OTHER PUBLICATIONS

Office action for U.S. Appl. No. 10/711,731 dated Oct. 20, 2008.
Office Action for U.S. Appl. No. 11/365,355 dated Dec. 28, 2010.
Office Action for AU appln 2005292566 dated Jun. 23, 2010.
Office Action for AU appln 2005292568 dated Apr. 27, 2010.
Office Action for CN appln 20050041052.2 dated Nov. 27, 2009.
Office Action for CN appln 2005800470611 dated Jul. 1, 2010.
Office Action for U.S. Appl. No. 10/711,731 dated Jan. 6, 2010.
Office Action for U.S. Appl. No. 10/956,832 dated Feb. 18, 2010.
Office Action for U.S. Appl. No. 10/711,731 dated Sep. 21, 2009.
Official Action for Israeli Patent Application No. 182286 dated Dec. 23, 2010 (including translation).
US Notice of Allowance on 099011-0473 DTD May 20, 2011.
US Notice of Allowance on 099011-0550 DTD Apr. 13, 2011.
US Office Action for U.S. Appl. No. 11/255,311 DTD Sep. 30, 2010.
US Office Action for U.S. Appl. No. 11/365,355 DTD Dec. 28, 2010.
US Office Action for U.S. Appl. No. 11/557,683 DTD Jan. 19, 2011.
Chinese Office Action for 200580041061.1 dated Jul. 27, 2011.
Japanese Official Action for 2007-534586 dated Sep. 27, 2011.
Notice of Allowance on U.S. Appl. No. 11/365,355 dated Jul. 22, 2011.
Advisory Action for U.S. Appl. No. 11/255,311 dated Dec. 21, 2010.
Chinese Office Action for 200580041052.2 dated Apr. 25, 2011.
Chinese Office Action on 200580041061.1 dated Mar. 12, 2012.
Chinese Office Action on 200580041061.1 dated Apr. 9, 2013.
European Second Exam Report on 07115382.9 dated Mar. 9, 2012.
European Second Examination Report on 05785370.7 dated Feb. 14, 2012.
First Indian Examination Report on 1377/KOLNP/2007 dated Mar. 12, 2013.
First Indian Examination Report on 1449/KOLNP/2007 dated Mar. 7, 2013.
Japanese Office Action on 2007-534586 dated Jan. 20, 2012.
Japanese Official Action for 2007-534586 dated Jun. 7, 2011.
Notice of Allowance on U.S. Appl. No. 12/783,266 dated Jun. 12, 2012.
Notice of Allowance on U.S. Appl. No. 13/208,970 dated Jul. 18, 2012.
Office Action on U.S. Appl. No. 12/783,266 dated Jan. 4, 2012.
Office Action on U.S. Appl. No. 13/208,970 dated Apr. 6, 2012.

* cited by examiner

METHOD AND APPARATUS FOR PROVIDING AUTHORIZED REMOTE ACCESS TO APPLICATION SESSIONS

FIELD OF THE INVENTION

The present invention relates to a method and apparatus for providing authorized remote access to a plurality of application sessions and, in particular, to a method and apparatus for providing authorized remote access to a plurality of application sessions implementing enhanced security.

BACKGROUND OF THE INVENTION

Technologies for providing remote access to networked resources include a variety of server/client software combinations. MetaFrame™ server software in communication with Intelligent Computing Architecture (ICA) clients, available from Citrix Systems, Inc., Ft. Lauderdale, Fla., and X Servers in communication with X Windows clients available from the X Consortium are two examples that provide remote access to applications executing on a server.

Computer user behavior and the stability of network communication channels over which their computers communicate are often unpredictable. Networked users on occasion need to change computing environments while forgetting to, or without having the opportunity to fully save their work product or to shut down their systems. In other cases, communication channels unexpectedly fail or computers crash, which can result in the loss of work product, if the session is not restored or terminated gracefully.

When a computer user changes from one computing environment to another, access control decisions may change. Existing methods fail to provide smooth reconnection of the user to sessions where access does not change while maintaining unauthorized sessions for future reconnection when the user returns to an authorized environment. A method that detects shifts in computing environments, identifies changes in access control rights stemming from such shifts, and reconnects the user only to authorized sessions would be desirable.

BRIEF SUMMARY OF THE INVENTION

The present invention relates to a method and apparatus providing authorized remote access to a plurality of application sessions implementing enhanced security.

In one aspect, the invention relates to a method for providing authorized remote access to a plurality (e.g., two or more) of application sessions includes receiving information associated with a user. A collection agent gathers the information and transmits it to a policy engine. The policy engine makes an access control decision based on the received information. In one embodiment, the policy engine also identifies a plurality of application sessions already associated with the user in response to the information. The method also includes connecting a client node operated by the user to the identified plurality of application sessions in response to the received information. In some embodiments, there can be multiple applications sessions, and some of the multiple applications sessions can be running on multiple servers.

In another aspect, the invention relates to a method and an apparatus for granting authorized access to resources. The apparatus comprises a policy engine including two components. The first component receives information about a client node and generates a data set from the information. The second component receives the data set, and provides to the first component an enumeration of resources available to the client based on the received data set. The first component presents the enumeration of resources to the client node.

In one embodiment, the first component receives the information from a collection agent. In one embodiment, each component further comprises a database. The database in the first component stores conditions. The database in the second component stores policies. The first component applies the conditions to the received information and the second component applies the policies to the received data set. In this embodiment, the policies determine the application sessions that the client node may access.

BRIEF DESCRIPTION OF THE DRAWINGS

These and other aspects of this invention will be readily apparent from the detailed description below and the appended drawings, which are meant to illustrate and not to limit the invention, and in which.

DETAILED DESCRIPTION OF THE INVENTION

The illustrative embodiment of the present invention is applicable to a distributed networking environment where a remote user requests access to content. Prior to discussing the specifics of the present invention, it may be helpful to discuss some of the network environments in which the illustrative embodiment of the present invention may be employed.

Figure 1A:
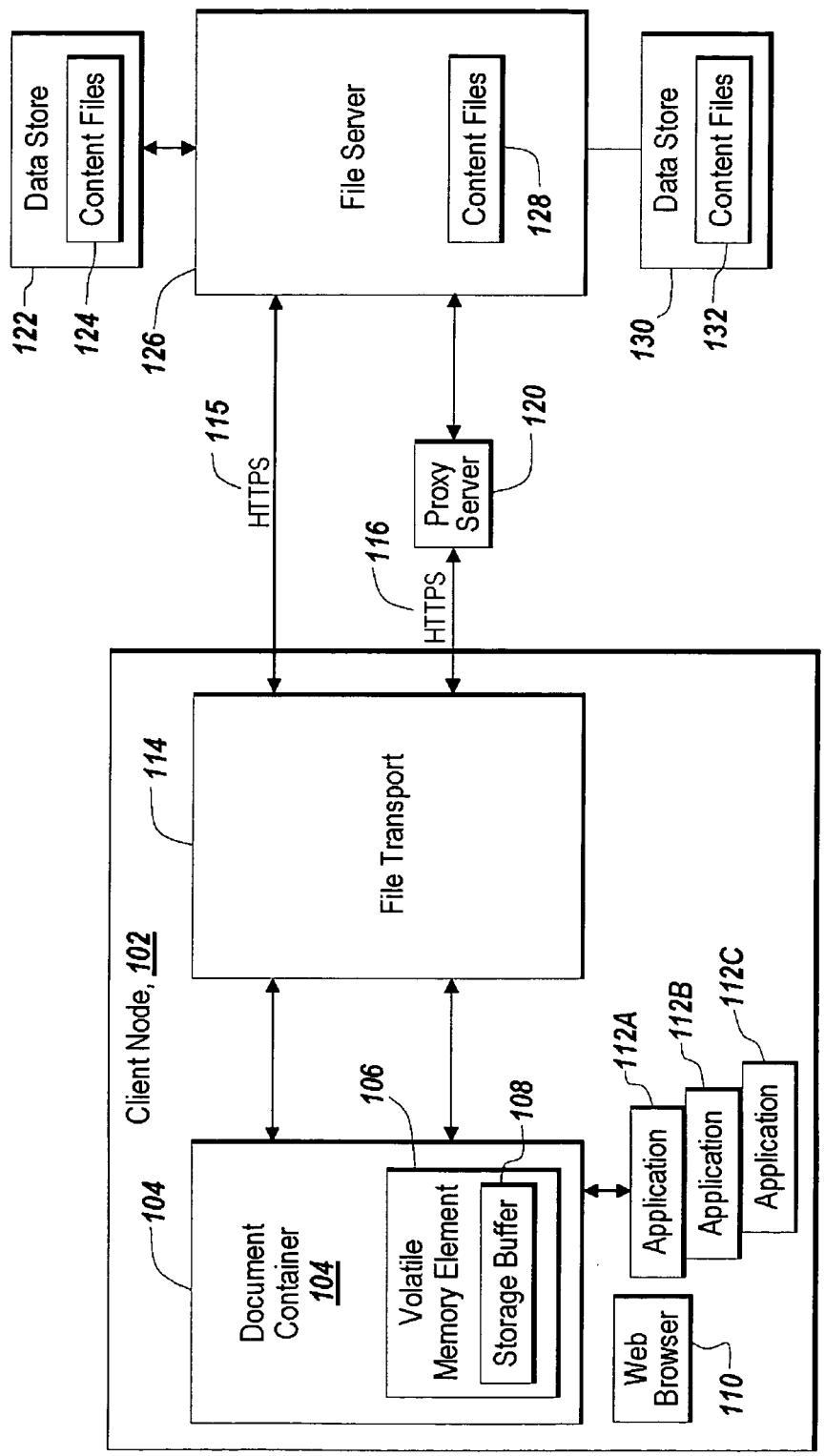
FIG. 1A is a block diagram of an environment suitable for practicing the illustrative embodiment of the present invention.

FIG. 1A is a block diagram of an environment suitable for practicing the illustrative embodiment of the present invention. A client node 102 includes a web browser 110 and application programs 112a, 112b . . . 112n. An application program is any program that processes data to provide output and that uses an operating system for access to system resources. Exemplary application programs include: word processing applications, such as MICROSOFT WORD, manufactured by Microsoft Corporation of Redmond, Wash.; spreadsheet programs, such as MICROSOFT EXCEL, manufactured by Microsoft Corporation; electronic mail programs, such as MICROSOFT OUTLOOK, manufactured by Microsoft Corporation and GROUPWISE, manufactured by Novell Corp. of Provo, Utah; and productivity suites such as STAR OFFICE, manufactured by Sun Microsystems of Mountain View, Calif.

A content server 126 includes content files 128 and may be connected to data stores 122 and 130 holding additional content files 124 and 132 respectively. Those skilled in the art will recognize that other network storage devices or document repositories holding content files may also be networked to the content server 126 without departing from the scope of the present invention. A user of the client node 102 may request content from the content server 126 using the web browser 110 to send a request such as the depicted Hypertext Transport Protocol Secure (HTTPS) request 115, or an HTTP (Hypertext Transport Protocol), FTP (File Transport Protocol) request, or, for operations on file shares, SMB (Server Management Block Protocol) request.

Figure 1B:
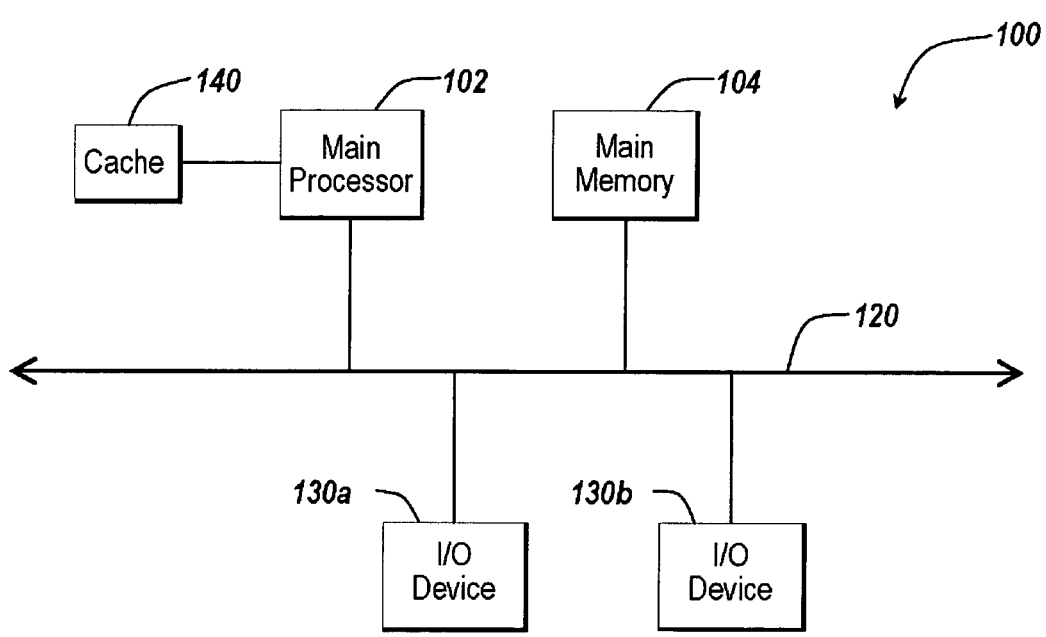
FIGS. 1B and 1C are block diagrams depicting embodiments of computers useful in connection with the present invention.
Figure 1C:
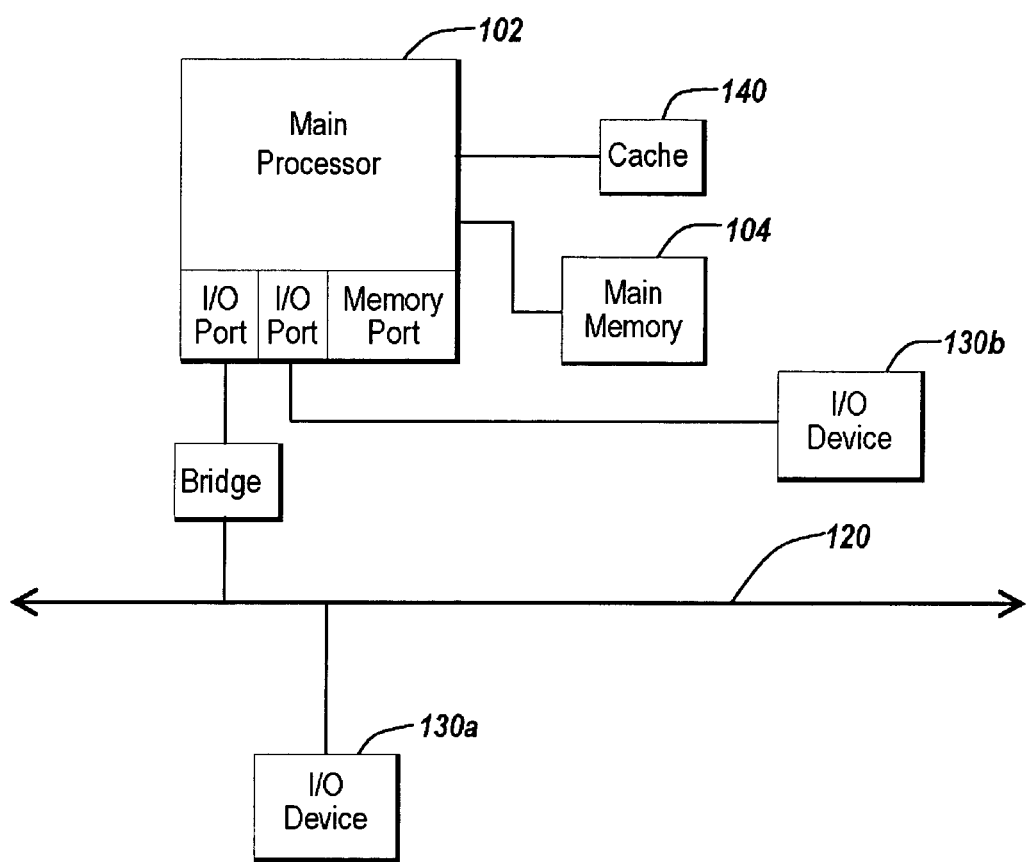

In many embodiments, the content server 126, client node 102, and the proxy server 120 are provided as personal computer or computer servers, of the sort manufactured by the Hewlett-Packard Corporation of Palo Alto, Calif. or the Dell Corporation of Round Rock, Tex. FIGS. 1B and 1C depict block diagrams of a typical computer 100 useful as the content server 126, the proxy server 120, or the client node 102 in those embodiments. As shown in FIGS. 1B and 1C, each computer 100 includes a central processing unit 102, and a main memory unit 104. Each computer 100 may also include other optional elements, such as one or more input/output devices 130a-130n (generally referred to using reference numeral 130), and a cache memory 140 in communication with the central processing unit 102.

The central processing unit 102 is any logic circuitry that responds to and processes instructions fetched from the main memory unit 104. In many embodiments, the central processing unit is provided by a microprocessor unit, such as: the 8088, the 80286, the 80386, the 80486, the Pentium, Pentium Pro, the Pentium II, the Celeron, or the Xeon processor, all of which are manufactured by Intel Corporation of Mountain View, Calif.; the 68000, the 68010, the 68020, the 68030, the 68040, the PowerPC 601, the PowerPC604, the PowerPC604e, the MPC603e, the MPC603ei, the MPC603ev, the MPC603r, the MPC603p, the MPC740, the MPC745, the MPC750, the MPC755, the MPC7400, the MPC7410, the MPC7441, the MPC7445, the MPC7447, the MPC7450, the MPC7451, the MPC7455, the MPC7457 processor, all of which are manufactured by Motorola Corporation of Schaumburg, Ill.; the Crusoe TM5800, the Crusoe TM5600, the Crusoe TM5500, the Crusoe TM5400, the Efficeon TM8600, the Efficeon TM8300, or the Efficeon TM8620 processor, manufactured by Transmeta Corporation of Santa Clara, Calif.; the. RS/6000 processor, the RS64, the RS 64 11, the P2SC, the POWER3, the RS64 III, the POWER3-II, the RS 64 IV, the POWER4, the POWER4+, the POWER5, or the POWER6 processor, all of which are manufactured by International Business Machines of White Plains, N.Y.; or the AMD Opteron, the AMD Athalon 64 FX, the AMD Athalon, or the AMD Duron processor, manufactured by Advanced Micro Devices of Sunnyvale, Calif.

Main memory unit 104 may be one or more memory chips capable of storing data and allowing any storage location to be directly accessed by the microprocessor 102, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM).

In the embodiment shown in FIG. 1B, the processor 102 communicates with main memory 104 via a system bus 120 (described in more detail below). FIG. 1C depicts an embodiment of a computer system 100 in which the processor communicates directly with main memory 104 via a memory port. For example, in FIG. 1C, the main memory 104 may be DRDRAM.

FIG. 1B and FIG. 1C depict embodiments in which the main processor 102 communicates directly with cache memory 140 via a secondary bus, sometimes referred to as a "backside" bus. In other embodiments, the main processor 102 communicates with cache memory 140 using the system bus 120. Cache memory 140 typically has a faster response time than main memory 104 and is typically provided by SRAM, BSRAM, or EDRAM.

In the embodiment shown in FIG. 1B, the processor 102 communicates with various I/O devices 130 via a local system bus 120. Various busses may be used to connect the central processing unit 102 to the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display, the processor 102 may use an Advanced Graphics Port (AGP) to communicate with the display. FIG. 1C depicts an embodiment of a computer system 100 in which the main processor 102 communicates directly with I/O device 130b via HyperTransport, Rapid I/O, or InfiniBand. FIG. 1C also depicts an embodiment in which local busses and direct communication are mixed: the processor 102 communicates with I/O device 130a using a local interconnect bus while communicating with I/O device 130b directly.

A wide variety of I/O devices 130 may be present in the computer system 100. Input devices include keyboards, mice, trackpads, trackballs, microphones, and drawing tablets. Output devices include video displays, speakers, inkjet printers, laser printers, and dye-sublimation printers. An I/O device may also provide mass storage for the computer system 100 such as a hard disk drive, a floppy disk drive for receiving floppy disks such as 3.5-inch, 5.25-inch disks or ZIP disks, a CD-ROM drive, a CD-R/RW drive, a DVD-ROM drive, tape drives of various formats, and USB storage devices such as the USB Flash Drive line of devices manufactured by Twintech Industry, Inc. of Los Alamitos, Calif.

In further embodiments, an I/O device 130 may be a bridge between the system bus 120 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

General-purpose desktop computers of the sort depicted in FIG. 1B and FIG. 1C typically operate under the control of operating systems, which control scheduling of tasks and access to system resources. Typical operating systems include: MICROSOFT WINDOWS, manufactured by Microsoft Corp. of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, among others.

The client node 102 may be any personal computer (e.g., 286, 386, 486, Pentium, Pentium II, Macintosh computer), Windows-based terminal, Network Computer, wireless device, information appliance, RISC Power PC, X-device, workstation, mini computer, main frame computer, personal digital assistant, or other computing device that has a windows-based desktop and sufficient persistent storage for executing a small, display presentation program. The display presentation program uses commands and data sent to it across communication channels to render a graphical display. Windows-oriented platforms supported by the client node 102 can include, without limitation, WINDOWS 3.x, WINDOWS 95, WINDOWS 98, WINDOWS NT 3.51, WINDOWS NT 4.0, WINDOWS 2000, WINDOWS CE, MAC/OS, Java, and UNIX. The client node 102 can include a visual display device (e.g., a computer monitor), a data entry device (e.g., a keyboard), persistent or volatile storage (e.g., computer memory) for storing downloaded application programs, a processor, and a mouse. Execution of a small, display presentation program allows the client node 102 to participate in a distributed computer system model (i.e., a server-based computing model).

For embodiments in which the client node 102 is a mobile device, the device may be a JAVA-enabled cellular telephone, such as the i50sx, i55sr, i58sr, i85s, i88s, i90c, i95cl, or the im11000, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In other embodiments in which the client node 102 is mobile, it may be a personal digital assistant (PDA) operating under control of the PalmOS operating system, such as the Tungsten W, the VII, the VIIx, the i705, all of which are manufactured by palmOne, Inc. of Milpitas, Calif. In further embodiments, the client node 102 may be a personal digital assistant (PDA) operating under control of the PocketPC operating system, such as the iPAQ 4155, iPAQ 5555, iPAQ 1945, iPAQ 2215, and iPAQ 4255, all of which manufactured by Hewlett-Packard Corporation of Palo Alto, Calif., the ViewSonic V36, manufactured by ViewSonic of Walnut, Calif., or the Toshiba PocketPC e405, manufactured by Toshiba America, Inc. of New York, N.Y. In still other embodiments, the client node is a combination PDA/telephone device such as the Treo 180, Treo 270 or Treo 600, all of which are manufactured by palmOne, Inc. of Milpitas, Calif. In still further embodiments, the client node 102 is a cellular telephone that operates under control of the PocketPC operating system, such as the MPx200, manufactured by Motorola Corp.

Figure 1D:
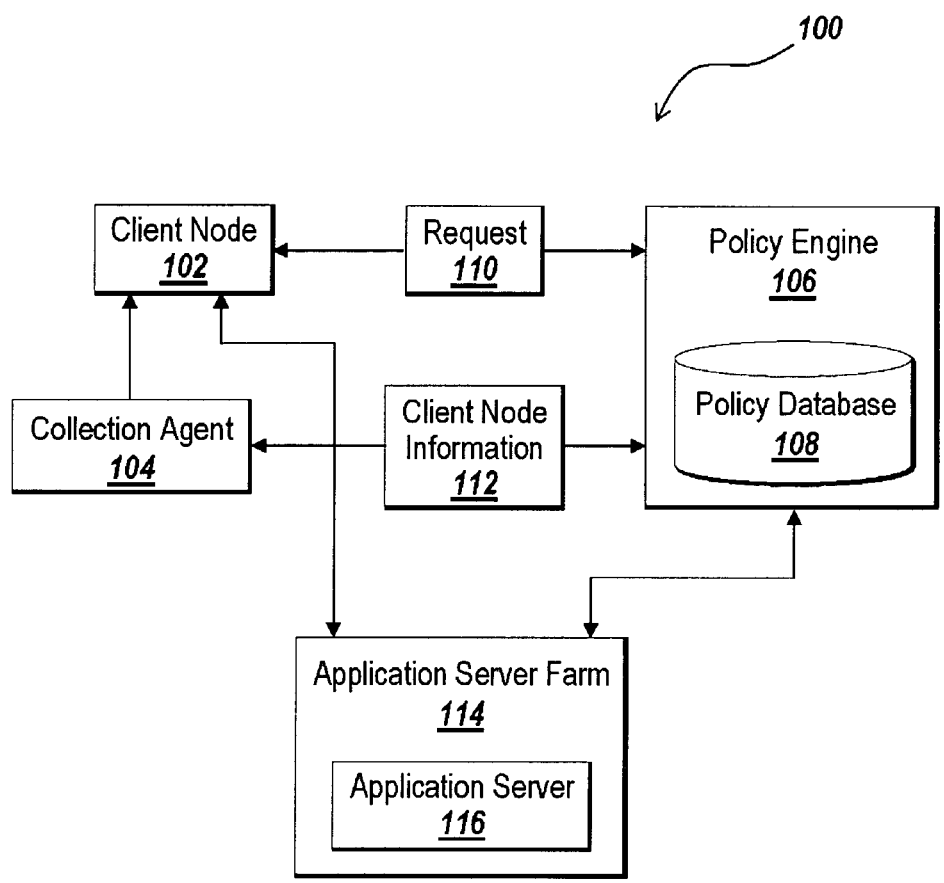
FIG. 1D is a block diagram of an embodiment of a computer network in which the network provides a policy-based system of granting access to network resources.

Referring now to FIG. 1D, one embodiment of a computer network 100 constructed in accordance with the invention is depicted, which includes a client node 102, a collection agent 104, a policy engine 106, a policy database 108, an application server farm 114, and an application server 116. Although only one client node 102, collection agent 104, policy engine 106, application server farm 114, and application server 116 are depicted in the embodiment shown in FIG. 1D, it should be understood that the system may provide multiple ones of any or each of those components. For example, in one embodiment, the system 100 includes multiple, logically-grouped application server 116, each of which are available to execute applications on behalf of a client node 102. In these embodiments, the logical group of servers may be referred to as a "server farm." In some of these embodiments, the servers may be geographically dispersed.

In brief overview, when the client node 102 transmits a request 110 to the policy engine 106 for access to a resource, the collection agent 104 communicates with client node 102, retrieving information about the client node 102, and transmits the client node information 112 to the policy engine 106. The policy engine 106 makes an access control decision by applying a policy from the policy database 108 to the received information 112.

In more detail, the client node 102 transmits a request 110 for a resource to the policy engine 106. In some embodiments, the client node 102 transmits the request 110 over a network connection. The network can be a local area network (LAN), a metropolitan area network (MAN), or a wide area network (WAN) such as the Internet. The client node 102 and the policy engine 106 may connect to a network through a variety of connections including standard telephone lines, LAN or WAN links (e.g., T1, T3, 56 kb, X.25), broadband connections (ISDN, Frame Relay, ATM), and wireless connections. Connections between the client node 102 and the policy engine 106 may use a variety of data-link layer communication protocols (e.g., TCP/IP, IPX, SPX, NetBIOS, NetBEUI, SMB, Ethernet, ARCNET, Fiber Distributed Data Interface (FDDI), RS232, IEEE 802.11, IEEE 802.11a, IEE 802.11b, IEEE 802.11g and direct asynchronous connections).

Upon receiving the request, the policy engine 106 initiates information gathering by the collection agent 104. The collection agent 104 gathers information regarding the client node 102 and transmits the information 112 to the policy engine 106.

In some embodiments, the collection agent 104 gathers and transmits the information 112 over a network connection. In some embodiments, the collection agent 104 comprises bytecode, such as an application written in the bytecode programming language JAVA. In some embodiments, the collection agent 104 comprises at least one script. In those embodiments, the collection agent 104 gathers information by running at least one script on the client node 102. In some embodiments, the collection agent comprises an Active X control on the client node 102. An Active X control is a specialized COM (Component Object Model) object that implements a set of interfaces that enable it to look and act like a control.

In some embodiments, the collection agent 104 executes on the client node. In other embodiments, the collection agent 104 resides on the policy engine 106. In still other embodiments, the collection agent 104 resides on a server. In other embodiments, the policy engine 106 resides on the server. In some of these embodiments, the collection agent 104 resides on both the policy engine 106 and the server.

In one embodiment, the policy engine 106 transmits the collection agent 104 to the client node 102. In one embodiment, the policy engine 106 requires a second execution of the collection agent 104 after the collection agent 104 has transmitted information 112 to the policy engine 106. In this embodiment, the policy engine 106 may have insufficient information 112 to determine whether the client node 102 satisfies a particular condition. In other embodiments, the policy engine 106 requires a plurality of executions of the collection agent 104 in response to received information 112.

In some embodiments, the policy engine 106 transmits instructions to the collection agent 104 determining the type of information the collection agent 104 gathers. In those embodiments, a system administrator may configure the instructions transmitted to the collection agent 104 from the policy engine 106. This provides greater control over the type of information collected. This also expands the types of access control decisions, which the policy engine 106 can make, due to the greater control over the type of information collected. The collection agent 104 gathers information 112 including, without limitation, machine ID of the client node, operating system type, existence of a patch to an operating system, MAC addresses of installed network cards, a digital watermark on the client device, membership in an Active Directory, existence of a virus scanner, existence of a personal firewall, an HTTP header, browser type, device type, network connection information, and authorization credentials.

In some embodiments, the device type is a personal digital assistant. In other embodiments, the device type is a cellular telephone. In other embodiments, the device type is a laptop computer. In other embodiments, the device type is a desktop computer. In other embodiments, the device type is an Internet kiosk.

In some embodiments, the digital watermark includes data embedding. In some embodiments, the watermark comprises a pattern of data inserted into a file to provide source information about the file. In other embodiments, the watermark comprises data hashing files to provide tamper detection. In other embodiments, the watermark provides copyright information about the file.

In some embodiments, the network connection information pertains to bandwidth capabilities. In other embodiments, the network connection information pertains to Internet Protocol address. In still other embodiments, the network connection information consists of an Internet Protocol address. In one embodiment, the network connection information comprises a network zone identifying the logon agent to which the client node provided authentication credentials.

In some embodiments, the authorization credentials include a number of types of authentication information, including without limitation, user names, client names, client addresses, passwords, PINs, voice samples, one-time passcodes, biometric data, digital certificates, tickets, etc. and combinations thereof. After receiving the gathered information 112, the policy engine 106 makes an access control decision based on the received information 112.

Figure 2:
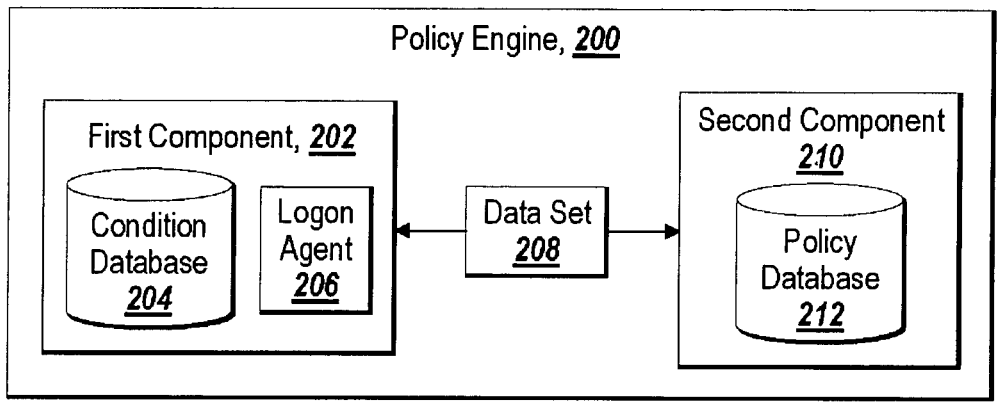
FIG. 2 is a more detailed block diagram of an embodiment of a policy engine.

Referring now to FIG. 2, it is a block diagram of one embodiment of a policy engine 200, including a first component 202 comprising a condition database 204 and a logon agent 206, and including a second component 210 comprising a policy database 212. The first component 202 applies a condition from the condition database 204 to information received about client node 102 and determines whether the received information satisfies the condition.

In some embodiments, the first component 202 and the second component 210 are logically separate but not physically separate. In some embodiments, the first component 202 and the second component 210 are logically and physically separate. In some embodiments, the condition database 204 resides on the first component 202. In other embodiments, the condition database 204 resides on the second component 210.

In some embodiments, a condition may require that the client node 102 execute a particular operating system to satisfy the condition. In some embodiments, a condition may require that the client node 102 execute a particular operating system patch to satisfy the condition. In still other embodiments, a condition may require that the client node 102 provide a MAC address for each installed network card to satisfy the condition. In some embodiments, a condition may require that the client node 102 indicate membership in a particular Active Directory to satisfy the condition. In another embodiment, a condition may require that the client node 102 execute a virus scanner to satisfy the condition. In other embodiments, a condition may require that the client node 102 execute a personal firewall to satisfy the condition. In some embodiments, a condition may require that the client node 102 comprise a particular device type to satisfy the condition. In other embodiments, a condition may require that the client node 102 establish a particular type of network connection to satisfy the condition.

If the received information satisfies a condition, the first component 202 stores an identifier for that condition in a data set 208. In one embodiment, the received information satisfies a condition if the information makes the condition true. For example, a condition may require that a particular operating system be installed. If the client node 102 has that operating system, the condition is true and satisfied. In another embodiment, the received information satisfies a condition if the information makes the condition false. For example, a condition may address whether spyware exists on the client node 102. If the client node 102 does not contain spyware, the condition is false and satisfied.

In some embodiments, the logon agent 206 resides outside of the policy engine 200. In other embodiments, the logon agent 206 resides on the policy engine 200. In one embodiment, the first component 202 includes a logon agent 206, which initiates the information gathering about client node 102. In some embodiments, the logon agent 206 further comprises a data store. In these embodiments, the data store includes the conditions for which the collection agent may gather information. This data store is distinct from the condition database 204.

In some embodiments, the logon agent 206 initiates information gathering by executing the collection agent 104. In other embodiments, the logon agent 206 initiates information gathering by transmitting the collection agent 104 to the client node 102 for execution on the client node 102. In still other embodiments, the logon agent 206 initiates additional information gathering after receiving information 112. In one embodiment, the logon agent 206 also receives the information 112. In this embodiment, the logon agent 206 generates the data set 208 based upon the received information 112. In some embodiments, the logon agent 206 generates the data set 208 by applying a condition from the database 204 to the information received from the collection agent 104.

In another embodiment, the first component 202 includes a plurality of logon agents 206. In this embodiment, at least one of the plurality of logon agents 206 resides on each network domain from which a client node 102 may transmit a resource request. In this embodiment, the client node 102 transmits the resource request to a particular logon agent 206. In some embodiments, the logon agent 206 transmits to the policy engine 200 the network domain from which the client node 102 accessed the logon agent 206. In one embodiment, the network domain from which the client node 102 accesses a logon agent 206 is referred to as the network zone of the client node 102.

The condition database 204 stores the conditions which the first component 202 applies to received information. The policy database 212 stores the policies, which the second component 210 applies to the received data set. In some embodiments, the condition database 204 and the policy database 212 store data in an ODBC-compliant database. For example, the condition database 204 and the policy database 212 may be provided as an ORACLE database, manufactured by Oracle Corporation of Redwood Shores, Calif. In other embodiments, the condition database 204 and the policy database 212 can be a Microsoft ACCESS database or a Microsoft SQL server database, manufactured by Microsoft Corporation of Redmond, Wash.

After the first component 202 applies the received information to each condition in the condition database 204, the first component transmits the data set 208 to second component 210. In one embodiment, the first component 202 transmits only the data set 208 to the second component 210. Therefore, in this embodiment, the second component 210 does not receive information 112, only identifiers for satisfied conditions. The second component 210 receives the data set 208 and makes an access control decision by applying a policy from the policy database 212 based upon the conditions identified within data set 208.

In one embodiment, policy database 212 stores the policies applied to the received information 112. In one embodiment, the policies stored in the policy database 212 are specified at least in part by the system administrator. In another embodiment, a user specifies at least some of the policies stored in the policy database 212. The user-specified policy or policies are stored as preferences. The policy database 212 can be stored in volatile or non-volatile memory or, for example, distributed through multiple servers.

In one embodiment, a policy allows access to a resource only if one or more conditions are satisfied. In another embodiment, a policy allows access to a resource but prohibits transmission of the resource to the client node 102. One of the policies stored in the policy database 212 might require or forbid automatic connection to disconnected application sessions. Yet another policy might make connection contingent on the client node 102 that requests access being within a secure network. Another policy might require or forbid automatic connection to active application sessions currently connected to a different client node 102. A further policy might only allow connection to application sessions after receiving user approval. Another policy might only allow connection for a predetermined time after disconnection. Still another policy only allows connection to application sessions that include specific applications. One policy might allow viewing only of the transformed contents of a requested file. A policy might allow the viewing of only an HTML version of the requested file. In some embodiments, access to a resource is provided while download of the file to the client node 102 is prevented. This may be accomplished in a number of ways, including: transformation of the file contents into a viewer-only format, transforming the file contents into HTML for viewing by a web browser, use of file type association to open the file using an application hosted by a server in a server farm instead of using an application hosted by the client node 102, or by using a system of the sort described in U.S. application Ser. No. 10/931,405, the contents of which are incorporated herein by reference.

In some of the embodiments above, the method and apparatus provide document protection for proprietary information. In these embodiments, the client node cannot access the networked resources unless the policy engine 106 grants the client node 102 permission to access the resources. In one of these embodiments, the policy engine 106 is the single exposed network element, to ensure that the client node 102 must access the policy engine 106 in order to access the networked resources. In another of these embodiments, the URLs used to access the networked resources behind the policy engine 106 are rewritten to prevent direct access by the client node 102. In others of the embodiments above, the method and apparatus enhance the capabilities of the client node to access resource otherwise inaccessible. In some of the embodiments above, the method and apparatus provide both protection of proprietary information and enhanced client node capabilities.

Figure 3:
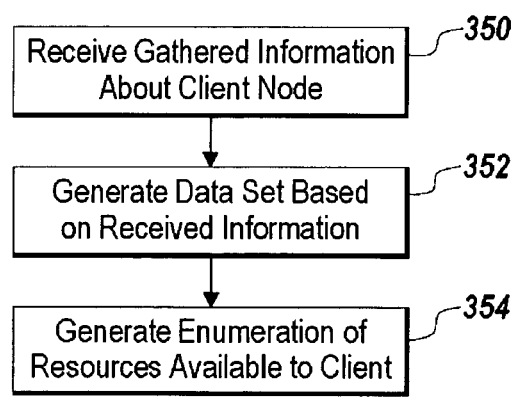
FIG. 3 is a flow diagram depicting one embodiment of the steps taken by a policy engine to make an access control decision based upon information received about a client node.

Referring now to FIG. 3, a flow diagram depicts one embodiment of the steps taken by the policy engine 106 to make an access control decision based upon information received about a client node 102. Upon receiving gathered information about the client node 102 (Step 350), the policy engine 106 generates a data set based upon the information (Step 352). In some embodiments, the policy engine 106 requests further information about the client node 102 from the collection agent 104. In these embodiments, the policy engine 106 requires more than one execution of the collection agent 104 on the client node 102. In those embodiments, the policy engine 106 generates the data set 208 after receiving the additional requested information. In these embodiments, the policy engine 106 may have insufficient information 112 to determine whether the client node 102 satisfies a particular condition. In others of these embodiments, the conditions may be indeterminate. In some of the embodiments where the conditions are indeterminate, the collection agent could not gather the information required to satisfy the condition.

The data set 208 contains identifiers for each condition satisfied by the received information 112. Then the policy engine 106 applies a policy to each identified condition within the data set 208. That application yields an enumeration of resources which the client node 102 may access (Step 354). In one embodiment, the resources comprise proprietary data. In some embodiments, the resources comprise web pages. In other embodiments, the resources comprise word processing documents. In still other embodiments, the resources comprise spreadsheets. In some embodiments, the enumeration includes only a subset of the resources that the client node 102 may access. The policy engine 106 then presents that enumeration to the client node 102. In some embodiments, the policy engine 106 creates a Hypertext Markup Language (HTML) document used to present the enumeration to the client node.

Figure 4:
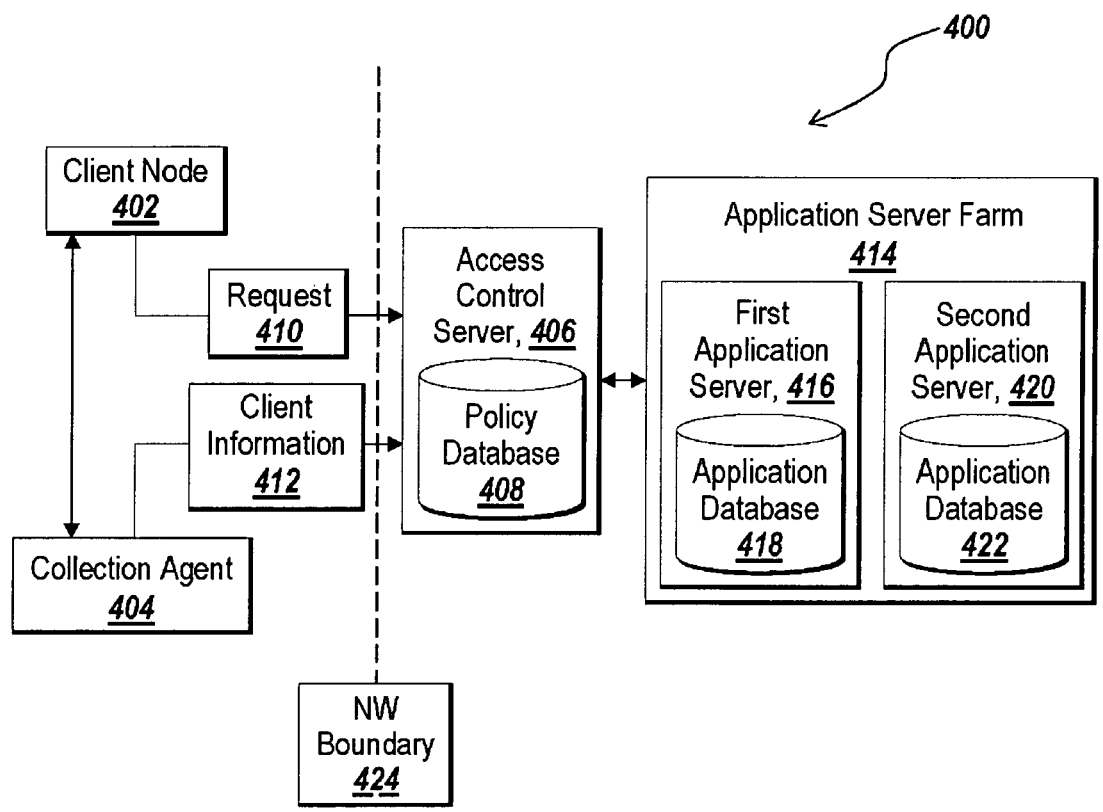
FIG. 4 is a block diagram of an embodiment of a computer network in which the network provides policy-based access to file contents for a client node.

Referring now to FIG. 4, one embodiment of a computer network 400 constructed in accordance with the invention is depicted, which includes a client node 402, a collection agent 404, an access control server 406, a policy database 408, an application server farm 414, a first application server 416, an application database 418, a second application server 420, and a second application database 422. In some embodiments, there is a network boundary separating the network on which the client node 402 resides from the network on which the access control server 406 and application server farm 414 reside.

In brief overview, when the client node 402 transmits to the access control server 406 a request 410 for access to a resource, the collection agent 404 communicates with client node 402, retrieving information about the client node 402, and transmitting client node information 412 to access control server 406. In one embodiment, the client node 402 transmits the request 410 after policy engine 106 presents the client node 402 with an enumeration of available resources. The access control server 406 makes an access control decision by applying a policy from the policy database 408 to the received information 412. Finally, the access control server 406 transmits a file type to the application server farm 414 for presentation of the file contents to the client node 402. Additional components of the computer network 400 are omitted and will be described further in FIG. 4B.

Figure 4B:
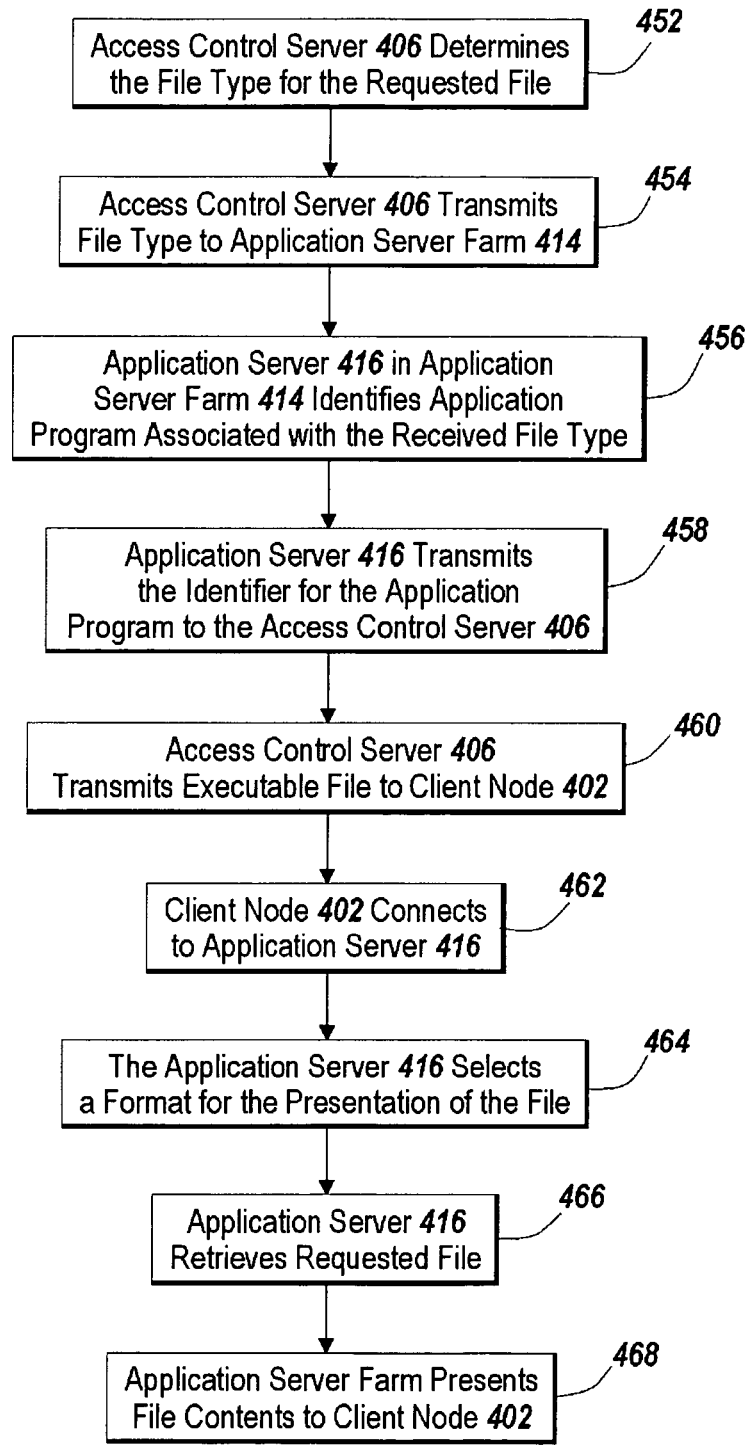
FIG. 4B is a flow diagram depicting one embodiment of the steps taken by an application server farm to provide file contents to a client node.

Referring now to FIG. 4B, a flow diagram depicts one embodiment of the steps taken by the access control server 406 and the application server farm 414 to provide file contents to the client node 402. Part of the application server farm 414 is an application server 416.

In one embodiment, once the access control server 406 decides to grant the client node 402 access to the requested file, the access control server 406 determines the file type for the requested file (Step 452). In other embodiments, the application server 416 determines the file type for the requested file. In still other embodiments, a server other than the application server 416 or the access control server 406. In some embodiments, the server determining the file type must first retrieve the requested file. In some of those embodiments, the file is located on the same side of the network boundary 424 as the server determining the file type. In others of those embodiments, the file is located on the same side of the network boundary 424 as the client node 402. In these embodiments, the method and apparatus enhance the capabilities of the client node to access resources otherwise inaccessible, but they do not provide document protection for proprietary information.

In some embodiments, the network boundary 424 physically separates at least two networks. In other embodiments, the network boundary 424 logically separates at least two networks. In one embodiment, the network boundary 424 is a firewall.

In one embodiment, the file extension is the file type and the server determining the file type does so by extracting the file extension from the file. In another embodiment, a resource fork is the file type. After determining file type, the server determining the file type transmits the file type to the application server farm 414 for retrieval and presentation to the client node 402 (Step 454).

The application server 416 receives the file type from the access control server 406. (Step 456). In some embodiments, the application server 416 identifies an application program associated with that file type. In other embodiments, the access control server 406 identifies an application program associated with that file type. In still other embodiments, a server other than the access control server 406 or the application server 416 identifies the application program associated with that file type.

In one embodiment, the server identifying the application program associated with the file type queries an application database 418 to retrieve an identifier for the application program. In some embodiments, the application database 418 is a registry file. In embodiments where either the application server 416 or a separate server identify the application type based on the file type, the identifying server then transmits to the access control server 406 the identifier to the application program. In some embodiments, the identifying server transmits the identifier to the access control server 406 over a network connection.

In some embodiments, neither the access control server 406 nor a separate server need to transmit the file type to the application server 416 to determine the identifier of the associated application program. In one of these embodiments, the application server 416 transmits to the access control server 406 a list of hosted application programs and the file types with which those application programs are associated. In these embodiments, the access control server 406 retrieves from the transmitted list the identifier for the application program associated with the file type.

When the access control server 406 receives the identifier of the application program, the access control server 406 creates and transmits to the client node 402 an executable file (Step 458). In some embodiments, the executable file contains the identifier of the application program. In some embodiments, the executable file contains the identifier of an application server in the application server farm 414 that will present the contents of the file to the client node 402. In some embodiments, the same application server 416 that identified the application program to use with the file type will present the contents of the file to the client node 402. In other embodiments, a second application server 420 presents the contents of the file to the client node 402. In one embodiment, the executable file contains both the identifier of the application program and the identifier of an application server in the application server farm 414 what will present the contents of the file to the client node 402. In some embodiments, the executable file enables the client node 402 to connect with an identified server using a presentation-layer protocol such as the Independent Computing Architecture (ICA) protocol, available from Citrix Systems, Inc. of Fort Lauderdale, Fla. In other embodiments, the executable file enables the client node 402 to connect with an identified server using the Remote Desktop Protocol (RDP), manufactured by Microsoft Corporation. In other embodiments, the presentation-layer protocol is wrapped in a higher protocol.

The client node 402 receives the executable file from the access control server 406. The client node 402 connects to the application server 416 identified in the executable file (Step 460). In one embodiment, the client node 402 connects to the identified application server 416 using the ICA protocol. In another embodiment, the client node 402 connects to the identified application server 416 using RDP.

The application server 416 selects a format for the presentation of the file contents (Step 462). In other embodiments, the access control server 406 identifies the format used to present the file contents. In those embodiments, the access control server 406 may apply a policy to identify the available formats. In some embodiments, the application server 416 selects the format based upon received information about the client node 402. In other embodiments, the application server 416 selects the format by applying a policy to the received information.

The application server 416 accepts the client node 402 connection and retrieves the requested file (Step 464). In one embodiment, the application server 416 retrieves the file from a web server. In another embodiment, the application server 416 retrieves the file from a file server. In yet another embodiment, the retrieved file is an email attachment. In this embodiment, the application server 416 retrieves the file from an electronic mail server. In some embodiments, the mail server is a Lotus mail server. In other embodiments, the mail server is an Outlook mail server or an Outlook Web Access mail server.

The application server 416 then presents the contents of the file to the client node 402 over the connection (Step 468). In one embodiment, the file contents presented comprise an email attachment.

Figure 5:
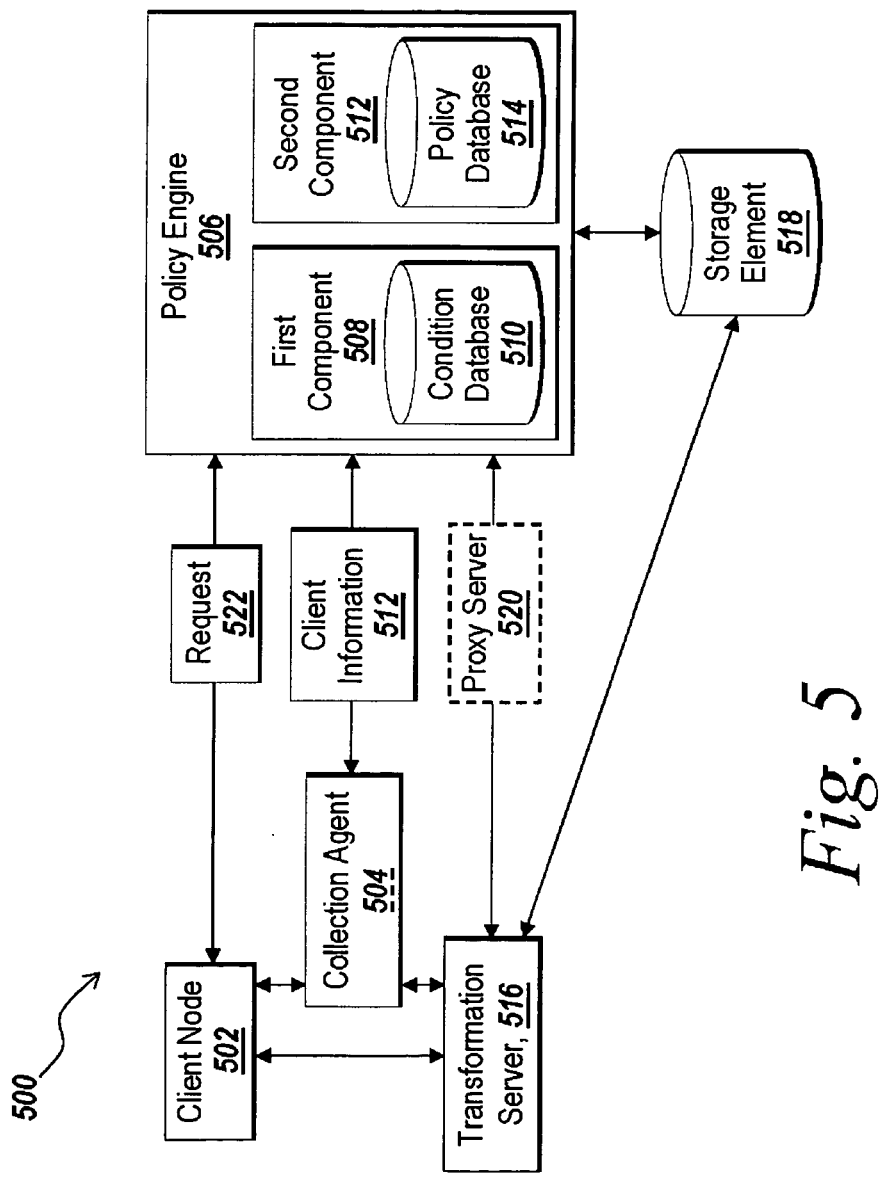
FIG. 5 is a block diagram of an embodiment of a computer network in which the network grants access to transformed content of a resource.

Referring to FIG. 5, one embodiment of a computer network 500 constructed in accordance with the invention is depicted, which includes a client node 502, a collection agent 504, a policy engine 506, a first component 508, a second component 512, a condition database 510, a policy database 512, a transformation server 516, and a storage element 518. In brief overview, when the client node 502 transmits a request 522 for access to a resource from the policy engine 506, the collection agent 504 communicates with client node 502, retrieving information about the client node 502, and transmitting client node information 512 to the policy engine 506. The policy engine 506 makes an access control decision as discussed in FIG. 3 above. Once the policy engine 506 decides to grant the client node 502 access to the requested file, the policy engine 506 transmits the request to the transformation server 516 for transformation and presentation to the client node 502.

In more detail, the policy engine 506 receives a request from the client node 502 for the transformed contents of a file. In one embodiment, the policy engine 506 identifies a transformation server 516 capable of presenting the transformed contents of the file to the client node 502. In some embodiments, the transformation server 516 is capable of presenting the transformed contents of the file because it contains a copy of previously transformed contents. In other embodiments, the transformation server 516 is capable of presenting the transformed contents of the file because it has the capacity to transform the file contents presently.

In one embodiment, the policy engine 506 identifies a transformation server 516 by querying a storage element 518 to determine whether a transformation server 516 previously transformed the contents of the file. In that embodiment, the policy engine 506 transmits the identifier of the transformation server 518 identified by the storage element 518 to the client node 502. In other embodiments, no transformation server 516 has previously transformed the contents. In those embodiments, the policy engine identifies instead a transformation server 516 capable of presently transforming the contents of the file and transmits the request of the client node 502 to that transformation server 516.

In other embodiments, a server other than the policy engine 506 identifies the transformation server 516 capable of presenting the transformed contents of the file to the client. In some of those embodiments, that same server also transmits to the transformation server 516 the request for presentation of the file to the client. In some of these embodiments, the same server identifying the capable transformation server 516 routes transmits the request to the transformation server 516 through a proxy server.

In one embodiment, the transformation server 516 receives the request from the policy engine 506 for transformation of the contents of a requested file and presentation to the client node 502. In another embodiment, the transformation server 516 receives the request from the server other than the policy engine 506. The transformation server 516 retrieves the file and transforms the contents from a native format to a second format. The transformation server 516 then accepts a connection from the client node 502 and presents the transformed contents of the file, transforming the contents if not previously transformed. Finally, the transformation server 516 writes to the storage element 518 the identifier of the server transforming the contents of the file and the identifier of the file.

Figure 6:
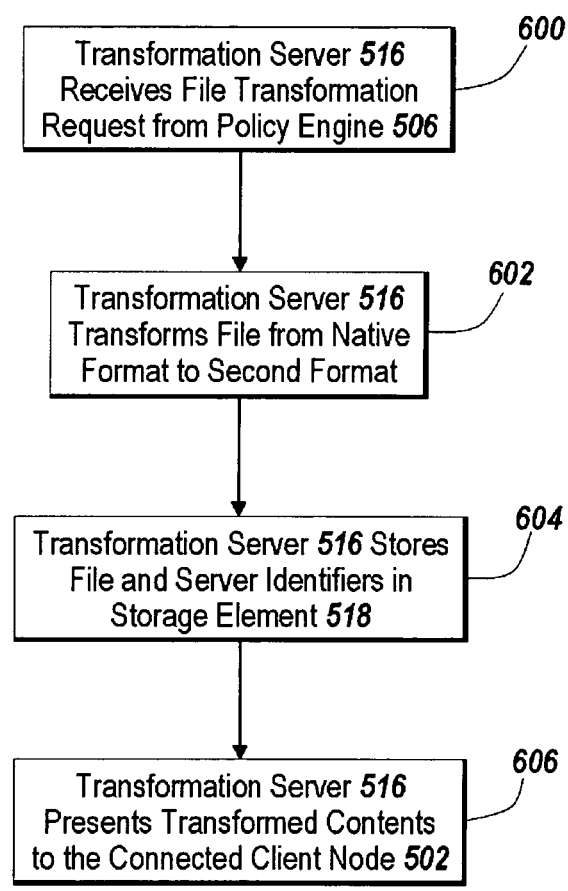
FIG. 6 is a flow diagram depicting one embodiment of the steps taken by a transformation server to transform the content of the requested file and present the transformed contents to a client node.

Referring now to FIG. 6, a flow diagram depicts one embodiment of the steps taken by the transformation server 516 to transform the content of the requested file and present the transformed contents to the client node 502.

The transformation server 516 receives the request for transformation of the contents of a requested file and presentation to the client node 502 (Step 600). In one embodiment, the transformation server 516 receives this request over a network connection.

The transformation server 516 transforms the contents of the requested file from a native format into a second format (Step 602). In one embodiment, the transformation server 516 transforms the contents of the file using regular expressions, from a native format into a second format for presentation on the client. In another embodiment, the transformation server 516 transforms the contents of the file into a second format from a native format, which contains a format conversion tool. In another embodiment, the transformation server 516 transforms the contents of the file from a native format into HTML. In another embodiment, the transformation server 516 transforms the contents of the file from a native format into a second format where the second format enables presentation on a personal digital assistant. In another embodiment, the transformation server 516 transforms the contents of the file from a native format into a second format, where the second format enables presentation on a cellular phone. In another embodiment, the transformation server 516 transforms the contents of the file from a native format into a second format, where the second format enables presentation on a laptop computer. In another embodiment, the transformation server 516 transforms the contents of the file from a native format into a second format, where the second format enables presentation at an Internet kiosk.

The transformation server 516 writes identifying information about the transformation to the storage element 518 (Step 604). In one embodiment, the identifying information includes an identifier for the transformation server 516 and an identifier for the transformed file. In some embodiments, the identifying information includes a temporary file containing the transformed contents of the file. In those embodiments, the storage element 518 functions as a global cache of transformed file contents.

After the policy engine 506 identifies the transformation server 516 capable of presenting the transformed contents of the file for the client node 502, the policy server 506 transmits the identifier of the transformation server 516 to the client node 502. The client node 502 receives the identifier and connects to the transformation server 516. The transformation server 516 accepts the connection and presents the transformed contents of the requested file to the client node 502 over the connection (Step 606). In one embodiment, the transformation server 516 retains the transformed contents of the requested file after the presentation to the client node 502.

Figure 7:
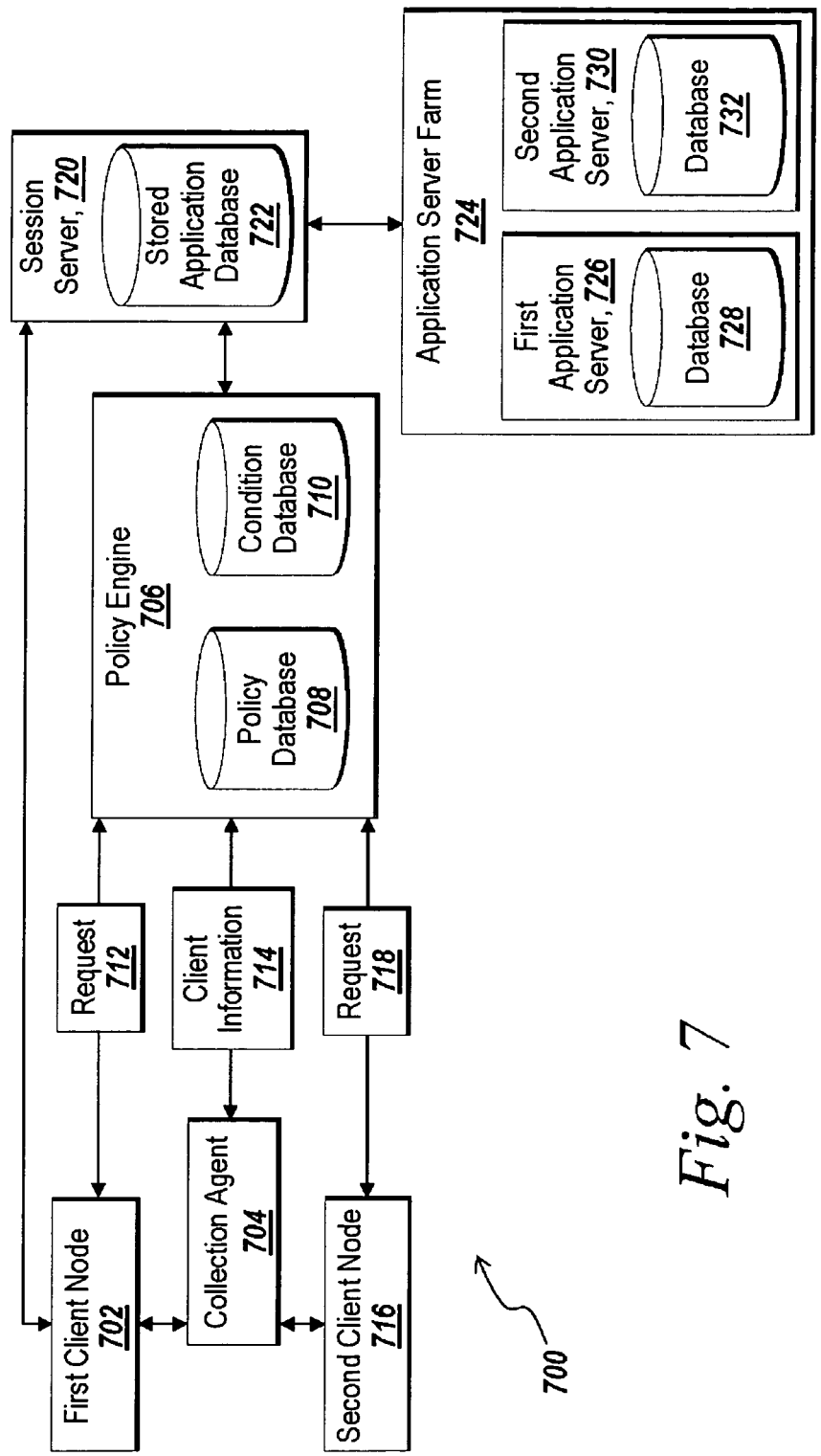
FIG. 7 is a block diagram of an embodiment of a computer network in which authorized remote access to a plurality of application sessions is provided.

Referring to FIG. 7, one embodiment of a computer network 700 constructed in accordance with the invention is depicted, which includes a first client node 702, a collection agent 704, an policy engine 706, a policy database 708, a condition database 710, a second client node 716, a session server 720, a stored application database 722, an application server farm 724, a first application server 726, a first database 728, a second application server 730, and a second database 732. In brief overview, when the first client node 702 transmits to the access control server 706 a request 712 for access to a resource, the collection agent 704 communicates with client node 702, retrieving information about client node 702, and transmitting client node information 714 to the policy engine 706. The policy engine 706 makes an access control decision, as discussed above in FIG. 3. Finally, the session server 720 establishes a connection between the client node 702 and a plurality of application sessions associated with the client node 702. Additional components of the computer network 700 are omitted and will be described further in FIG. 7B.

Figure 7B:
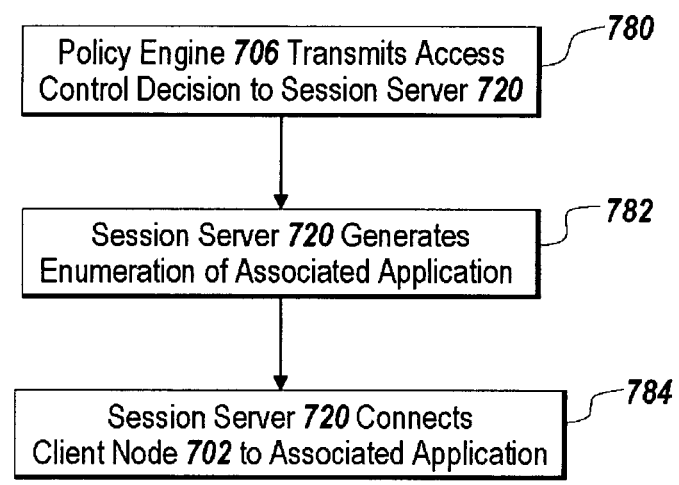
FIG. 7B is a flow diagram depicting one embodiment of the steps taken by a session server to connect a client node with its associated application sessions.

Referring now to FIG. 7B, a flow diagram depicts one embodiment of the steps taken by the session server 720 to connect the client node 702 with its associated application sessions. The session server 720 receives information about the client node 702 from the policy engine 706 containing access control decision the policy engine 706 made. In one embodiment, the information also includes the client node information 714.

In some embodiments, the policy engine 706 identifies a plurality of application sessions already associated with the client node 702. In other embodiments, the session server 720 identifies stored application sessions associated with the client node 702. In some of these embodiments, the session server 720 automatically identifies the stored application sessions upon receiving the information from the policy engine 706. In one embodiment, the stored application database 722 resides on the session server 720. In another embodiment, the stored application database 722 resides on the policy engine 706.

The stored application database 722 contains data associated with a plurality of servers in the application server farm 724 executing application sessions. In some embodiments, identifying the application sessions associated with the client node 702 requires consulting stored data associated with one or more servers executing application sessions. In some of these embodiments, the session store 720 consults the stored data associated with one or more servers executing application sessions. In others of these embodiments, the policy engine 706 consults the stored data associated with one or more servers executing application sessions. In some embodiments, a first application session runs on a first application server 726 and a second application session runs on a second application server 730. In other embodiments, all application sessions run on a single application server within the application server farm 724.

The session server 720 includes information related to application sessions initiated by users. The session server can be stored in volatile or non-volatile memory or, for example, distributed through multiple servers. Table 7-1 shows the data included in a portion of an illustrative session server 720.

TABLE 7-1

|  | Application Session | | |
| --- | --- | --- | --- |
|  | App Session 1 | App Session 2 | App Session 3 |
| User ID | User 1 | User 2 | User 1 |
| Client ID | First Client |  | First Client |
| Client Address | 172.16.0.50 |  | 172.16.0.50 |
| Status | Active | Disconnected | Active |
| Applications | Word Processor | Data Base | Spreadsheet |
| Process Number | 1 | 3 | 2 |
| Server | Server A | Server A | Server B |
| Server Address | 172.16.2.55 | 172.16.2.55 | 172.16.2.56 |

The illustrative session server 720 in Table 7-1 includes data associating each application session with the user that initiated the application session, an identification of the client computer 702 or 716, if any, from which the user is currently connected to the server 726, and the IP address of that client computer 702a or 716. The illustrative session server 720 also includes the status of each application session. An application session status can be, for example, "active" (meaning a user is connected to the application session), or "disconnected" (meaning a user is not connected to the application session). In an alternative embodiment, an application session status can also be set to "executing-disconnected" (meaning the user has disconnected from the application session, but the applications in the application session are still executing), or "stalled-disconnected" (meaning the user is disconnected and the applications in the application session are not executing, but their operational state immediately prior to the disconnection has been stored). The session server 720 further stores information indicating the applications 116 that are executing within each application session and data indicating each application's process on the server. In embodiments in which the server 726 is part of a server farm 724, the session server 720 is at least a part of the dynamic store, and also includes the data in the last two rows of Table 1 that indicate on which server in the server farm each application is/was executing, and the IP address of that server. In alternative embodiments, the session server 720 includes a status indicator for each application in each application session.

For example, in the example of Table 7-1, three application sessions exist, App Session 1, App Session 2, and App Session 3. App Session 1 is associated with User 1, who is currently using terminal 1. Terminal one's IP address is 152.16.2.50. The status of App Session 1 is active, and in App Session 1, a word processing program, is being executed. The word processing program is executing on Server A as process number 1. Server A's IP address is 152.16.2.55. App Session 2 in Table 1 is an example of a disconnected application session 118. App Session 2 is associated with User 2, but App Session 2 is not connected to a client computer 702a or 716. App Session 2 includes a database program that is executing on Server A, at IP address 152.16.2.55 as process number 3. App Session 3 is an example of how a user can interact with application sessions operating on different servers 726. App Session 3 is associated with User 1, as is App Session 1. App Session 3 includes a spreadsheet program that is executing on Server B at IP address 152.16.2.56 as process number 2, whereas the application session included in App Session 1 is executing on Server A.

In one embodiment, the session server 720 is configured to receive a disconnect request to disconnect the application sessions associated with the client node 702 and does so disconnect the application sessions in response to the request. The session server 720 continues to execute an application session after disconnecting the client node 702 from the application session. In this embodiment, the session server 720 accesses the stored application database 722 and updates a data record associated with each disconnected application session so that the record indicates that the application session associated with the client node 702 is disconnected.

Unintentional termination of application sessions resulting from imperfect network connections and users' failure to terminate their application sessions themselves can lead to user difficulties. One embodiment of the invention limits these difficulties by differentiating disconnection (which is treated as if the user is not done working with an application session) from termination (which is assumed to be an intentional end to the application session) and by correlating application sessions with users as opposed to client nodes. When a user is finished using an application operating in an application session, the user can terminate an application session. Termination generally involves the affirmative input of the user indicating that the server should no longer maintain the application session. Such affirmative user input can include selecting an "Exit" option from a menu, clicking on an icon, etc. In response to the session server 720 receiving a termination request, the execution of the application session and any application within that application session is halted. In one embodiment, data related to the application session is also removed from the stored application database 722.

Disconnection, either intentional or unintentional, on the other hand, does not result in termination of application sessions. Since the application or applications operating in an application session are executing on the server 720, a connection to the first client node 702 is not usually necessary to continue execution of the applications, and in one embodiment the applications can continue to execute while waiting for the user to connect. In an alternative embodiment, upon disconnection of a user, the session server 720 stalls the execution of the applications operating in the application session. That is, the session server 720 halts further execution of the applications, and the session server 720 stores the operational state of the application and any data the application is processing. In a further embodiment, the session server 720 can selectively stall execution of specific applications after a user disconnects. For example, in one embodiment, the session server 720 continues execution of an application for a fixed time period, and if a user fails to connect within that time period, the session server 720 stalls the application. In another embodiment, the session server 720 stalls specified application sessions that cannot continue executing without user input. In each of the above-described embodiments, if the user of the first client node 702 disconnects from the server 726 and then connects to the server 726 while operating the first client node 702, the second client node 716, or a third client computer, the session server 720 can connect the client computer operated by the user to one or more previously initiated, non-terminated application session(s) associated with the user, and reinitiate execution of any stalled applications.

In one embodiment, the session server 720 detects a disconnection. A user can intentionally and manually instruct the server to disconnect an application session from the client node 702 or 716 from which the user is communicating. For example, in one embodiment, application sessions provide a menu option for disconnection (as distinguished from termination above) that a user can select. The session server 720 can also detect an unintentional disconnection. For example, in one embodiment, session server 720 identifies when a predetermined number of data packets transmitted to a client node 702 or 716 have not been acknowledged by the client node 702 or 716. In another embodiment, the client node 702 or 716 periodically transmits a signal to the server 726 to confirm that a connection is still intact. If the session server 720 detects that a predetermined number of expected confirmation signals from a client node 702 or 716 have not arrived, session server 720 determines that the client node 702 or 716 has disconnected. If the session server 720 detects that a user has disconnected from an application session, either intentionally, or unintentionally, the entry in the session server 720 related to the disconnected application session is modified to reflect the disconnection.

After receiving authentication information, the session server 720 consults the stored applications database 722 to identify any active application sessions that are associated with the user, but that are connected to a different client node, such as the first client node 702, for example. In one embodiment, if the session server 720 identifies any such active application sessions, the session server 720 automatically disconnects the application session(s) from the first client node 702 and connects the application session(s) to the current client computer 716. In some embodiments, the received authentication information will restrict the application sessions to which the client node 702 may reconnect. In one embodiment, the user can trigger the automatic consultation of the session server and subsequent connection with the selection of a single user interface element.

After identifying the application sessions associated with the client node 702, the session server 720 connects the client node 702 to associated application sessions. The session server 720 determines whether each application session in the plurality is active or disconnected. In one embodiment, at least one application session in the plurality is active. In one embodiment, at least one application session in the plurality is disconnected. In one embodiment, the session server 720 receives the application output automatically. In another embodiment, receipt of the application output is triggered by client node 702 selection of a single user interface element. The session server 720 identifies disconnected application sessions to which to reconnect the client node 702 based upon the access control decision contained in the received information 714. In one embodiment, upon identifying any disconnected application sessions, the session server 720 prompts the user to indicate whether connection is desired. If connection is not desired, the session server 720 prompts user to indicate whether the disconnected applications sessions should remain disconnected, or whether the application sessions should be terminated.

In one embodiment, connection includes modifying the entry in the stored applications database 722 to indicate that the user is connected to the application session and to indicate from which client node 702 the user is connected to the server. Upon connection, the server 726 resumes transmitting application output data to the client node 702 or 716. In one embodiment, the plurality of application sessions associated with the client node was connected to the first client node 702 prior to connection and, after connection, the plurality of application sessions is reconnected to the first client node 702. In another embodiment, the plurality of application sessions associated with the client node was connected to the first client node 702 prior to connection and, after connection, the plurality of application sessions is reconnected to the second client node 716.

The following illustrative examples show how the methods and apparatus discussed above can be used to provide policy-based access to file contents for a client node. These examples are meant to illustrate and not to limit the invention.

Evidence Collection

In one embodiment, a client node 102 requests access to a word processing document located on a server residing on the same network as the policy engine 106 resides. The policy engine 106 receives the request and determines that it possesses no information about client node 102. The policy engine 106 transmits a collection agent 104 to the client node 102. In some embodiments, the collection agent 104 has pre-defined information to collect from the client node. In other embodiments, the collection agent 104 first analyzes the client node to determine what type of information to collect. In still other embodiments, the collection agent 104 retrieves from the policy engine 106 the instructions as to what information to collect about the client node 102.

Once executing on the client node 102, the collection agent 104 gathers the required information and transmits the information 112 to the policy engine 106. The policy engine 106 receives the information 112 and begins the process of determining what conditions the information 112 satisfies. In some embodiments, the policy engine 106 determines that the received information 112 does not suffice to determine whether the information 112 satisfies one or more conditions. In those embodiments, the policy engine 106 transmits further instructions to the collection agent 104 for gathering more information about the client node 102.

Policy-Based Access Control

As the first component 202 of the policy engine 106 determines that one or more conditions are satisfied, it stores an identifier for each satisfied condition in a data set. Upon completion, the first component 202 transmits the data set and the requested application to the second component 210. In an example of this embodiment, the requested application may be a word processing document and the conditions satisfied may indicate that the client device is a personal digital assistant. In another example of this embodiment, the requested application may be a spreadsheet and the conditions satisfied may indicate that the client device is a trusted laptop connecting from an insecure network such as a public internet kiosk. In a third example of this embodiment, the requested application may be a file attached to an electronic mail message and the conditions satisfied may indicate that the client device is on a personal desktop connecting from a secure network but lacking the appropriate application software to view the file.

The second component 210 receives the data set from the first component 202 and applies one or more policies to the received data. In one example of this embodiment, the second component 210 may apply a policy requiring that when a client device type is a personal digital assistant if the condition that the client node have on it application software is not satisfied, the client node receive the transformed contents of the file. The client node would then receive an executable file enabling connection to a transformation server, which will present the contents of the file in a format accessible to the client device type. Applying this policy enables the client node to view the contents of the file in spite of inappropriate form factor for viewing In another example of this embodiment, the second component 210 may apply a policy prohibiting download to the client node 102 when a client device type is a trusted laptop, containing the appropriate application software, but from an insecure network such as an Internet kiosk. In this embodiment, the policy might require that the policy engine 106 transmit an executable file to the client node 102 enabling connection to an application server 416 for presentation of the file contents. Applying a policy of this type, and retrieving the file only to the application server 416, enables the client node 102 to view the contents of the file without jeopardizing the proprietary contents of the file from inappropriate dissemination.

In yet another example of this embodiment, the second component 210 may apply a policy requiring that a personal desktop making a secure connection, but lacking appropriate application software, connect to an application server 416 via an ICA session, and that the application server 416 execute the appropriate application and present the file to the client node 102. Applying the policy enables the client node 102 to view the contents of the file regardless of the lack of application software on the client node 102.

The present invention may be provided as one or more computer-readable programs embodied on or in one or more articles of manufacture. The article of manufacture may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more articles of manufacture as object code.

While the invention has been shown and described with reference to specific preferred embodiments, it should be understood by those skilled in the art that various changes in form and detail may be made therein without departing from the spirit and scope of the invention as defined by the following claims.

What is claimed as new and desired to be protected by Letters Patent of the United States is:

1. A method for providing a user with authorized remote access to one of one or more application sessions disconnected from one or more client nodes previously operated by the user, the method comprising:

disconnecting a first client node comprising a computing environment operated by a user, by a session server, from a resource provided by an application session provided by an application server providing a plurality of application sessions via a first communication channel;

receiving a request, from a second client node comprising a second computing environment operated by the user, for access to the resource;

receiving, by a first component of the policy engine, characteristics of the second computing environment gathered by a collection agent from the second client node in response to the request to access the resource;

generating, by the first component of the policy engine, a data set from the received characteristics, responsive to applying a first policy to the received characteristics and storing an identifier for each condition satisfied in the data set;

transmitting, by the first component of the policy engine, the data set to a second component of the policy engine;

making, by the second component of the policy engine, an access control decision granting the second computing environment access to the resource based on application of a second policy to the generated data set;

identifying, based on the access control decision, the application session provided by the application server disconnected from the first client node previously operated by the user, from one or more application sessions to which the second client node is permitted to connect;

establishing, by the session server, a connection between the second client node and the identified application session provided by the application server in response to the identification via a second communication channel, wherein the second communication channel is wireless and different from the first communication channel; and selecting, by the application server responsive to the connection, a format for the presentation of the resource based on application of a second policy to the received characteristics of the second computing environment.

2. The method of claim 1 wherein step (a) further comprises requesting the resource over a network connection.

3. The method of claim 1 wherein step (b) further comprises gathering the characteristics over a network connection.

4. The method of claim 1 wherein step (b) further comprises gathering the characteristics by executing at least one script on the client node.

5. The method of claim 1 wherein step (d) further comprises determining if the received characteristics satisfies a condition.

6. The method of claim 5 further comprising determining if the received characteristics satisfies a condition by comparing the received information to at least one condition.

7. The method of claim 6 wherein step (d) further comprises making an access control decision by applying a policy to the condition.

8. The method of claim 1 wherein a first one of the application sessions is running on a first server and a second one of the application sessions is running on a second server.

9. The method of claim 1 wherein the step of establishing, by the session server, a connection between the client node and the one or more application sessions is subject to a rule permitting the client node to connect to the one or more application sessions.

10. The method of claim 1 wherein the connection between the client node and the one or more application sessions is triggered by the selection of a single user interface element.

11. The method of claim 1 further comprising the step of receiving, by a session server, a disconnect request to disconnect a first application session associated with the user and a second application session associated with the user;

and disconnecting, by the session server, the first and second application sessions.

12. The method of claim 11 further comprising updating, by the session server, at least one data record associated with the first and second application sessions to indicate that the first and second application sessions are disconnected.

13. The method of claim 12 further comprising the step of continuing, by the session server, execution of one or more applications for at least one of the disconnected application sessions.

14. The method of claim 1 wherein the one or more application sessions was connected to a first client node prior to connection and, after connection, the one or more application sessions is reconnected to the first client node.

15. The method of claim 1 wherein the one or more application sessions was associated with a first client node prior to establishing the connection and, after establishing the connection, the one or more application sessions is connected to a second client node.

16. The method of claim 1 wherein at least one application session is disconnected.

17. The method of claim 1 wherein at least one application session is active.

18. The method of claim 1 wherein the identifying one or more applications sessions is automatic upon receipt of authentication information.

19. The method of claim 1 further comprising the step of providing for receiving application output from a one or more previously disconnected application sessions associated with the user in response to the received information.

20. The method of claim 19 further comprising disconnecting at least one active application session associated with the user in response to the received information.

21. The method of claim 19 wherein the one or more active application sessions is initially connected to a first client node and, upon requesting access to the resource, the user is operating a second client node.

22. The method of claim 19, wherein the receipt of application output from the one or more active application sessions is subject to a rule permitting the user to have a client node operated by the user to connect to the one or more active application sessions.

23. The method of claim 19 wherein the receipt of application output from the one or more active application sessions and the receipt of application output from the one or more disconnected application sessions are triggered by the selection of a single user interface element.

24. The method of claim 19 wherein the one or more disconnected application sessions was connected to a first client node prior to disconnection and, at connection, the one or more disconnected application session is reconnected to the first client node.

25. The method of claim 19 wherein the one or more disconnected application sessions was connected to a first client node prior to disconnection and, at connection, the one or more disconnected application session is connected to a second client node.

26. A system for providing a user with authorized remote access to one of one or more application sessions disconnected from one or more client nodes previously operated by the user, the system comprising:
   a session server disconnecting a first client node comprising a computing environment operated by a user from a resource provided by an application session provided by an application server providing a plurality of application sessions via a first communication session, and receiving a request from a second client node comprising a second computing environment operated by the user;
   a first component of the policy engine:
      receiving characteristics of the second computing environment gathered by a collection agent from the second client node in response to the request to access the resource,
      generating a data set from the received characteristics, responsive to applying a first policy to the received characteristics and storing an identifier for each condition satisfied in the data set,
      transmitting the data set to a second component of the policy engine;
   the second component of the policy engine:
      making an access control decision granting the second computing environment access to the resource based on the application of a second policy to the generated data set; and
      identifying, based on the access control decision, the application session provided by the application server disconnected from the first client node previously operated by the user, from one or more application sessions to which the second client node is permitted to connect;
   wherein the session server establishes a connection between the second client node and the identified application session provided by the application server in response to the identification via a second communication channel that is wireless and different from the first communication channel; and
   an application server, responsive to the connection, selects a format for the presentation of the resource based on application of a second policy to the received characteristics of the second computing environment.

27. The system of claim 26 wherein the collection agent executes on the client node.

28. The system of claim 26 wherein the policy engine transmits the collection agent to the client node.

29. The system of claim 26 wherein the policy engine transmits instructions to the collection agent determining the type of information the collection agent gathers.

30. The system of claim 26 wherein a first one of the application sessions is running on a first server and a second one of the application sessions is running on a second server.

31. The system of claim 26 wherein the session server connects the client node to the one or more application sessions.

32. The system of claim 31 wherein the connection of the client node to the one or more application sessions is triggered by selection of a single user interface element.

33. The system of claim 31 wherein the session server is also configured to receive a disconnect request to disconnect the first application session associated with the user and the second application session associated with the user and disconnect the first and second application sessions in response to the request.

34. The system of claim 33 wherein the session server is further configured to update at least one data record associated with each of the first and second application sessions to indicate that the first and second application sessions are disconnected.

35. The system of claim 26 wherein the policy engine further comprises stored data associated with one or more servers executing application sessions.

36. The system of claim 26 wherein the one or more application sessions was connected to a first client node prior to connection and, after connection, the one or more application sessions is reconnected to the first client node.

37. The system of claim 26 wherein the one or more application sessions was associated with a first client node prior to connection and, after connection, the one or more application sessions is connected to a second client node.

38. The system of claim 26 wherein at least one of the one or more application sessions is disconnected.

39. The system of claim 26 wherein at least one of the one or more application sessions is active.

40. The method of claim 1 wherein step (b) further comprises gathering one or more of the following information about the client node: a machine identification (ID) of the client node, type of an operating system, existence of a patch to the operating system, a Media Access Control (MAC) address of a network card, a digital watermark on the client node, a membership in an Active Directory, an existence of a virus scanner, an existence of a personal firewall, an HTTP header, a browser type, a device type, network connection information, and authorization credentials.

41. The method of claim 1 wherein step (f) further comprises establishing the connection between the client node and the one or more application sessions responsive to the policy engine making the access control decision.

* * * * *